US010749647B2

(12) United States Patent
Seok

(10) Patent No.: US 10,749,647 B2
(45) Date of Patent: *Aug. 18, 2020

(54) BEAMFORMED TRANSMISSION IN HIGH EFFICIENCY WIRELESS LAN

(71) Applicant: NEWRACOM, INC., Lake Forest, CA (US)

(72) Inventor: Yongho Seok, Irvine, CA (US)

(73) Assignee: Newracom, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,718

(22) Filed: Dec. 26, 2018

(65) Prior Publication Data
US 2019/0149280 A1 May 16, 2019

Related U.S. Application Data

(63) Continuation of application No. 14/875,665, filed on Oct. 5, 2015, now Pat. No. 10,200,165.
(Continued)

(51) Int. Cl.
*H04L 5/00* (2006.01)
*H04B 7/06* (2006.01)
(Continued)

(52) U.S. Cl.
CPC ............ *H04L 5/003* (2013.01); *H04B 7/0617* (2013.01); *H04B 7/0628* (2013.01);
(Continued)

(58) Field of Classification Search
None
See application file for complete search history.

(56) References Cited

U.S. PATENT DOCUMENTS

| | | |
|---|---|---|
| 2007/0195811 A1* | 8/2007 | Basson ................. H04L 1/0026 370/441 |
| 2011/0149806 A1* | 6/2011 | Verma ................. H04L 12/2809 370/255 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Hassan A Phillips
*Assistant Examiner* — Gautam Sharma
(74) *Attorney, Agent, or Firm* — Morgan, Lewis & Bockius LLP

(57) ABSTRACT

The present disclosure relates to a method and apparatus for beamformed transmission in a wireless local area network. According to one aspect of the present disclosure, a method for transmitting a Physical layer Protocol Data Unit (PPDU) frame to a plurality of stations (STAs) by an Access Point (AP) in a wireless local area network may be provided. The method may include transmitting a SIGNAL field of the PPDU frame, the SIGNAL field including beamforming information indicating whether beamforming is applied to respective data units of the PPDU frame, and transmitting the data units of the PPDU frame, the data units being individually beamformed or not beamformed according to the beamforming information.

16 Claims, 32 Drawing Sheets

Related U.S. Application Data

(60) Provisional application No. 62/159,175, filed on May 8, 2015, provisional application No. 62/060,429, filed on Oct. 6, 2014.

(51) Int. Cl.
*H04W 16/28* (2009.01)
*H04W 84/12* (2009.01)
*H04B 7/0452* (2017.01)
*H04W 74/08* (2009.01)

(52) U.S. Cl.
CPC .......... *H04B 7/0452* (2013.01); *H04B 7/0669* (2013.01); *H04W 16/28* (2013.01); *H04W 74/085* (2013.01); *H04W 84/12* (2013.01)

(56) References Cited

U.S. PATENT DOCUMENTS

| | | | | |
|---|---|---|---|---|
| 2011/0205968 A1* | 8/2011 | Kim | .................... | H04W 72/085 370/328 |
| 2011/0249660 A1* | 10/2011 | Noh | .................... | H04L 5/0023 370/338 |
| 2012/0218983 A1* | 8/2012 | Noh | .................... | H04B 7/0452 370/338 |
| 2012/0281774 A1* | 11/2012 | Lee | .................... | H04B 7/0452 375/260 |
| 2012/0327871 A1* | 12/2012 | Ghosh | .................... | H04L 5/0023 370/329 |
| 2013/0039200 A1* | 2/2013 | Park | .................... | H04W 16/14 370/252 |
| 2013/0121243 A1* | 5/2013 | Vermani | .................... | H04L 1/0029 370/328 |
| 2013/0128807 A1* | 5/2013 | Vermani | .................... | H04L 5/0053 370/328 |
| 2013/0136157 A1* | 5/2013 | Son | .................... | H04L 5/0023 375/219 |
| 2014/0204891 A1* | 7/2014 | Park | .................... | H04W 56/00 370/329 |
| 2014/0348097 A1* | 11/2014 | Park | .................... | H04L 25/0226 370/329 |
| 2015/0271704 A1* | 9/2015 | Suh | .................... | H04L 5/0048 370/329 |
| 2016/0044676 A1* | 2/2016 | Choi | .................... | H04W 72/1289 370/329 |
| 2016/0065467 A1* | 3/2016 | Wu | .................... | H04L 65/60 370/392 |
| 2016/0066324 A1* | 3/2016 | Li | .................... | H04L 69/22 370/338 |
| 2016/0072564 A1* | 3/2016 | Li | .................... | H04L 5/0025 370/329 |
| 2016/0100381 A1* | 4/2016 | Li | .................... | H04L 5/0044 370/329 |
| 2016/0105227 A1* | 4/2016 | Lin | .................... | H04W 72/0453 370/329 |
| 2016/0112851 A1* | 4/2016 | Li | .................... | H04L 69/18 370/338 |
| 2016/0112899 A1* | 4/2016 | Kenney | .................... | H04W 52/241 370/338 |
| 2016/0143010 A1* | 5/2016 | Kenney | .................... | H04B 7/0452 370/330 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

| L-STF | L-LTF | L-SIG | HE-SIG-A | HE-STF | HE-LTF | HE-SIG-B | HE-LTF | HE-LTF | HE-SIG-C | PSDU(AP to STA6) |
|---|---|---|---|---|---|---|---|---|---|---|
| | | | | HE-STF | HE-LTF | HE-SIG-B | HE-LTF | HE-LTF | HE-SIG-C | PSDU(AP to STA5) |
| | | | | HE-STF | HE-LTF | HE-SIG-B | HE-LTF | HE-LTF | HE-SIG-C | PSDU(AP to STA3, STA4) |
| | | | | HE-STF | HE-LTF | HE-SIG-B | HE-LTF | HE-LTF | HE-SIG-C | PSDU(AP to STA1, STA2) |

| Frame Control | Duration | RA | TA | Sounding Dialog Token | STA Info 1 | ... | STA Info n | FCS |
|---|---|---|---|---|---|---|---|---|
| 2 | 2 | 6 | 6 | 1 | 2 or more | | 2 or more | 4 |

Octets:

FIG. 25

| | | | | PSDU (AP to STA5) | CH1 Beamformed |
|---|---|---|---|---|---|
| Legacy Preamble | HE-SIG-A | HE-SIG-B Beamformed of CH1 is true Beamformed of CH4 is true | HE-STF / HE-LTF | PSDU (AP to STA1) | |
| | | | | PSDU (AP to STA2) | PSDU (AP to STA6) CH2 Non-beamformed |
| | | | | PSDU (AP to STA3) | PSDU (AP to STA7) CH3 Non-beamformed |
| | | | | PSDU (AP to STA4) | |
| | | | | PSDU (AP to STA8) | CH4 Beamformed |

DL OFDMA mode

BEAMFORMED TRANSMISSION IN HIGH EFFICIENCY WIRELESS LAN

CROSS-REFERENCE TO RELATED APPLICATIONS

This application is a continuation of application Ser. No. 14/875,665, filed on Oct. 5, 2015, now U.S. Pat. No. 10,200,165, which claims the benefit of U.S. Provisional Application No. 62/060,429, filed on Oct. 6, 2014, and U.S. Provisional Application No. 62/159,175, filed on May 8, 2015, the entirety of each of which is incorporated herein by reference for all purpose.

BACKGROUND

Field

The present disclosure relates to a Wireless Local Area Network (WLAN) and, more particularly, to a method, apparatus, and software for beamformed transmission in a high efficiency WLAN, and a recording medium in which the software is stored.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, a detailed scheme for performing beamformed transmission in the HEW has not been decided yet.

SUMMARY

Objects of the present disclosure are to provide a method and apparatus for performing beamformed transmission in a WLAN supporting downlink multi-user transmission or uplink multi-user transmission.

The objects of the present disclosure are not limited to the foregoing descriptions, and additional objects will become apparent to those having ordinary skill in the pertinent art to the present disclosure based upon the following description.

In accordance with an aspect of the present disclosure, a method for transmitting a Physical layer Protocol Data Unit (PPDU) frame to a plurality of stations (STAs) by an Access Point (AP) in a wireless local area network may be provided. The method may include transmitting a SIGNAL field of the PPDU frame, the SIGNAL field including beamforming information indicating whether beamforming is applied to respective data units of the PPDU frame; and transmitting the data units of the PPDU frame, the data units being individually beamformed or not beamformed according to the beamforming information.

In accordance with another aspect of the present disclosure, a method for transmitting a Physical layer Protocol Data Unit (PPDU) frame to an Access Point (AP) by a station (STA) in a wireless local area network may be provided. The method may include receiving a trigger frame eliciting the PPDU frame simultaneously transmitted from a plurality of STAs including the STA and at least one other STA, the trigger frame including beamforming information indicating whether beamforming is applied to respective data units of the PPDU frame; and transmitting the PPDU frame including a data unit of the STA, the data unit of the STA being individually beamformed or not beamformed according to the beamforming information.

In accordance with another aspect of the present disclosure, an Access Point (AP) for transmitting a Physical layer Protocol Data Unit (PPDU) frame to a plurality of stations (STAs) in a wireless local area network may be provided. The AP may include a baseband processor, a Radio Frequency (RF) transceiver, and a memory. The baseband processor may be configured to transmit a SIGNAL field of the PPDU frame using the RF transceiver, the SIGNAL field including beamforming information indicating whether beamforming is applied to respective data units of the PPDU frame; and to transmit the data units of the PPDU frame using the transceiver, the data units being individually beamformed or not beamformed according to the beamforming information.

In accordance with another aspect of the present disclosure, a station (STA) for transmitting a Physical layer Protocol Data Unit (PPDU) frame to an Access Point (AP) in a wireless local area network may be provided. The STA may include a baseband processor, a Radio Frequency (RF) processor, and a memory. The baseband processor may be configured to receive a trigger frame eliciting the PPDU frame simultaneously transmitted from a plurality of STAs including the STA and at least one other STA using the transceiver, the trigger frame including beamforming information indicating whether beamforming is applied to respective data units of the PPDU frame; and to transmit the PPDU frame including a data unit of the STA using the transceiver, the data unit of the STA being individually beamformed or not beamformed according to the beamforming information.

In accordance with another aspect of the present disclosure, software or a computer-readable medium having executable instructions for an Access Point (AP) to transmit a Physical layer Protocol Data Unit (PPDU) frame to a plurality of stations (STAs) in a wireless local area network may be provided. The executable instructions may cause the AP to transmit a SIGNAL field of the PPDU frame, the SIGNAL field including beamforming information indicating whether beamforming is applied to respective data units of the PPDU frame; and to transmit the data units of the PPDU frame, the data units being individually beamformed or not beamformed according to the beamforming information.

In accordance with another aspect of the present disclosure software or a computer-readable medium having executable instructions for a station (STA) to transmit a Physical layer Protocol Data Unit (PPDU) frame to an Access Point (AP) in a wireless local area network may be provided. The executable instructions may cause the STA to receive a trigger frame eliciting the PPDU frame simultaneously transmitted from a plurality of STAs including the STA and at least one other STA, the trigger frame including beamforming information indicating whether beamforming is applied to respective data units of the PPDU frame; and to transmit the PPDU frame including a data unit of the STA, the data unit of the STA being individually beamformed or not beamformed according to the beamforming information.

It is to be understood that both the foregoing summarized features are exemplary aspects of the following detailed description of the present disclosure without limiting the scope of the present disclosure.

According to the present disclosure, a method and apparatus for performing beamformed transmission in a WLAN supporting downlink multi-user transmission or uplink multi-user transmission are provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of an High Efficiency Long Training Field (HE-LTF) field in a HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 15 depicts another exemplary HE PPDU frame format according to the present disclosure;

FIG. 19 depicts an exemplary NDPA frame format according to the present disclosure;

FIGS. 24 and 25 depict exemplary DL HE PPDU frame formats supporting DL beamforming transmission according to the present disclosure;

DETAILED DESCRIPTION

Figure 1:
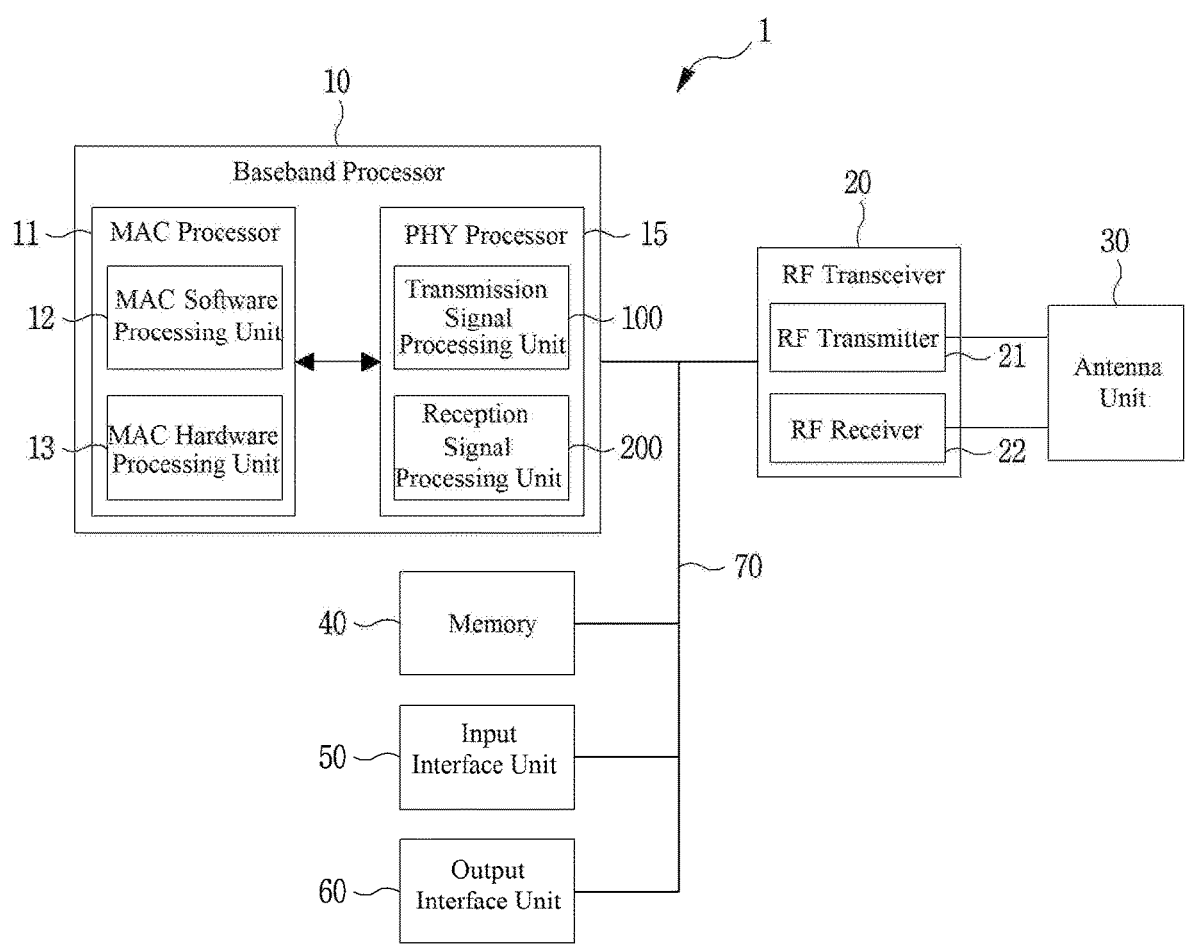
FIG. 1 is a block diagram of a Wireless Local Area Network (WLAN) device.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer in conformance to Institute of Electrical and Electronics Engineers (IEEE) 802.11 series standards. At least one of the WLAN devices may be an Access Point (AP) and the other WLAN devices may be non-AP Stations (non-AP STAs). Alternatively, all of the WLAN devices may be non-AP STAs in an ad-hoc network. Generally, the term STA covers AP STA and non-AP STA. However, only a non-AP STA may be referred to as a STA, for the convenience's sake.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmission signal processing unit 100 and a reception signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
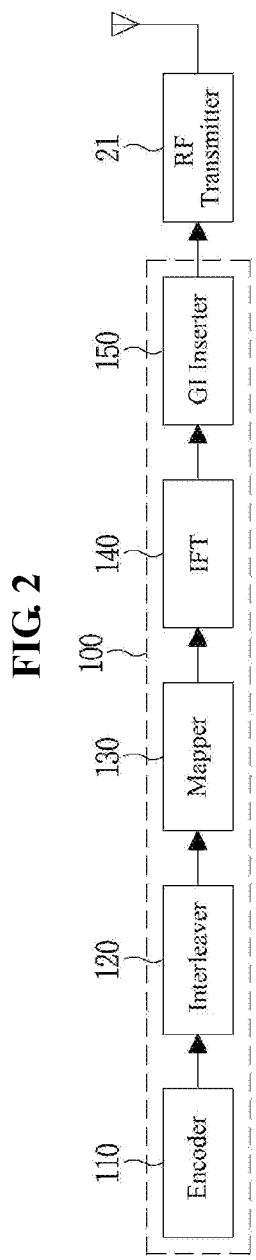
FIG. 2 is a schematic block diagram of an exemplary transmission signal processing unit in a WLAN.

FIG. 2 is a schematic block diagram of an exemplary transmission signal processor in a WLAN.

Referring to FIG. 2, the transmission signal processing unit 100 includes an encoder 110, an interleaver 120, a mapper 130, an Inverse Fourier Transform (IFT) processor 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmission signal processing unit 100 may further include a scrambler for scrambling input data before encoding to reduce the probability of long sequences of 0s or 1s. If a BCC encoding scheme is used in the encoder 110, the transmission signal processing unit 100 may further include an encoder parser for demultiplexing the scrambled bits among a plurality of BCC encoders. If an LDPC encoding scheme is used in the encoder 110, the transmission signal processing unit 100 may not use the encoder parser.

The interleaver 120 interleaves the bits of each stream output from the encoder 110 to change orders of bits. Interleaving may be applied only when a BCC encoding scheme is used in the encoder 110. The mapper 130 maps a sequence of bits output from the interleaver 120 to constellation points. If an LDPC encoding scheme is used in the encoder 110, the mapper 130 may further perform LDPC tone mapping besides the constellation point mapping.

In MIMO or MU-MIMO, the transmission signal processing unit 100 may use as many interleavers 120 as and as many mappers 130 as the number $N_{SS}$ of spatial streams. In this case, the transmission signal processing unit 100 may further include a stream parser for dividing the outputs of the BCC encoders or the output of the LDPC encoder into a plurality of blocks to be provided to the different interleavers 120 or mappers 130. The transmission signal processing unit 100 may further include a Space-Time Block Code (STBC) encoder for spreading the constellation points from $N_{SS}$ spatial streams into $N_{STS}$ space-time streams and a spatial mapper for mapping the space-time streams to transmit chains. The spatial mapper may use direct mapping, spatial expansion, or beamforming.

The IFT processor 140 converts a block of constellation points output from the mapper 130 or the spatial mapper to a time-domain block (i.e., a symbol) by Inverse Discrete Fourier Transform (IDFT) or Inverse Fast Fourier Transform (IFFT). If the STBC encoder and the spatial mapper are used, the IFT processor 140 may be provided for each transmit chain.

In MIMO or MU-MIMO, the transmission signal processing unit 100 may insert Cyclic Shift Diversities (CSDs) in order to prevent unintended beamforming. A CSD insertion may applied before or after IFT. A CSD may be specified for each transmit chain or for each space-time stream. Alternatively, the CSD may be applied as a part of the spatial mapper.

In MU-MIMO, some blocks before the spatial mapper may be provided for each user.

The GI inserter 150 prepends a GI to a symbol. The transmission signal processing unit 100 may optionally perform windowing to smooth edges of each symbol after inserting the GI. The RF transmitter 21 converts the symbols into an RF signal and transmits the RF signal via the antenna unit 30. In MIMO or MU-MIMO, the GI inserter 150 and the RF transmitter 21 may be provided for each transmit chain.

Figure 3:
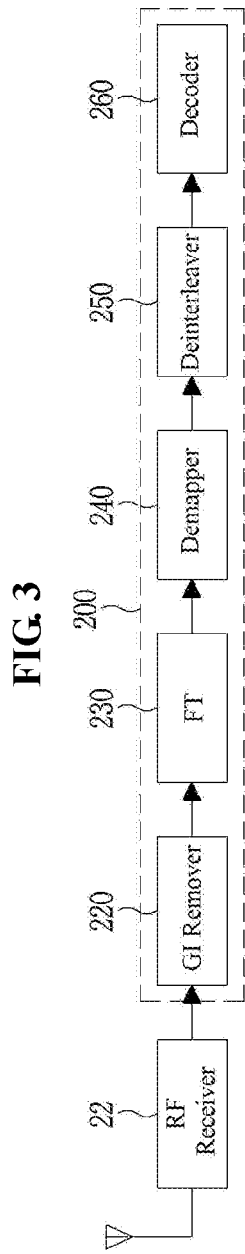
FIG. 3 is a schematic block diagram of an exemplary reception signal processing unit in a WLAN.

FIG. 3 is a schematic block diagram of an exemplary a reception signal processor in a WLAN.

Referring to FIG. 3, the reception signal processing unit 200 includes a GI remover 220, a Fourier Transform (FT) processor 230, a demapper 240, a deinterleaver 250, and a decoder 260.

The RF receiver 22 receives an RF signal via the antenna unit 30 and converts the RF signal into symbols. The GI remover 220 removes a GI from the symbols. In MIMO or MU-MIMO, the RF receiver 22 and the GI remover 220 may be provided for each receive chain.

The FT 230 converts the symbol (i.e., the time-domain block) into a block of constellation points by Discrete Fourier Transform (DFT) or Fast Fourier Transform (FFT). The FT processor 230 may be provided for each receive chain.

In MIMO or MU-MIMO, the reception signal processing unit 200 may include a spatial demapper for converting Fourier Transformed receiver chains to constellation points of space-time streams, and an STBC decoder for despreading the constellation points from the space-time streams into the spatial streams.

The demapper 240 demaps constellation points output from the FT processor 230 or the STBC decoder to bit streams. If an LDPC encoding scheme has been applied to the received signal, the demapper 240 may further perform LDPC tone demapping before the constellation demapping. The deinterleaver 250 deinterleaves the bits of each of the streams output from the demapper 240. Deinterleaving may be applied only when a BCC encoding scheme has been applied to the received signal.

In MIMO or MU-MIMO, the reception signal processing unit 200 may use as many demappers 240 as and as many deinterleavers 250 as the number of spatial streams. In this case, the reception signal processing unit 200 may further include a stream deparser for combining streams output from the deinterleavers 250.

The decoder 260 decodes streams output from the deinterleaver 250 or the stream deparser. For example, the decoder 100 may be an FEC decoder. The FEC decoder may include a BCC decoder or an LDPC decoder. The reception signal processing unit 200 may further include a descrambler for descrambling the decoded data. If a BCC decoding scheme is used in the decoder 260, the reception signal processing unit 200 may further include an encoder deparser for multiplexing data decoded by a plurality of BCC decoders. If an LDPC decoding scheme is used in the decoder 260, the reception signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
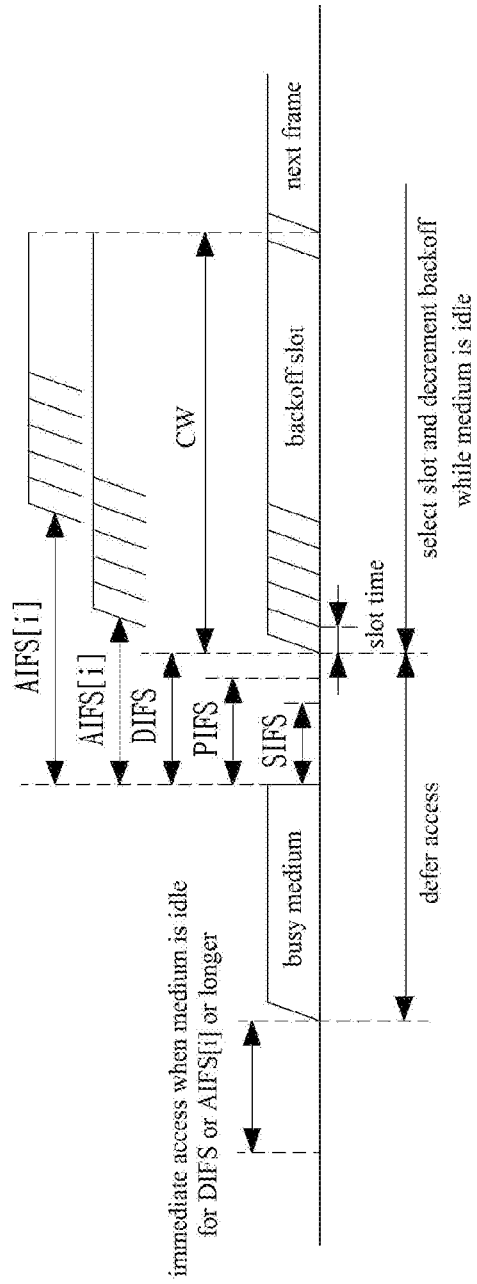
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data to be forwarded to a higher layer. After a Distributed Coordination Function IFS (DIFS) from a time when a medium gets idle, a WLAN device performs a backoff and then transmits a data frame. A management frame is used for exchanging management information which is not forwarded to the higher layer. After an IFS such as the DIFS or a Point Coordination Function IFS (PIFS), the WLAN device transmits the management frame. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. If the control frame is not a response frame to another frame, the WLAN device performs a backoff after the DIFS and then transmits the control frame; or if the control frame is a response frame to another frame, the WLAN device transmits the control frame after a Short IFS (SIFS) without a backoff. The type and subtype of a frame may be identified by a type field and a subtype field in a Frame Control (FC) field.

On the other hand, a Quality of Service (QoS) STA may perform a backoff after an Arbitration IFS (AIFS) for Access Category (AC), i.e., AIFS[i] (i is determined based on AC) and then transmit a frame. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
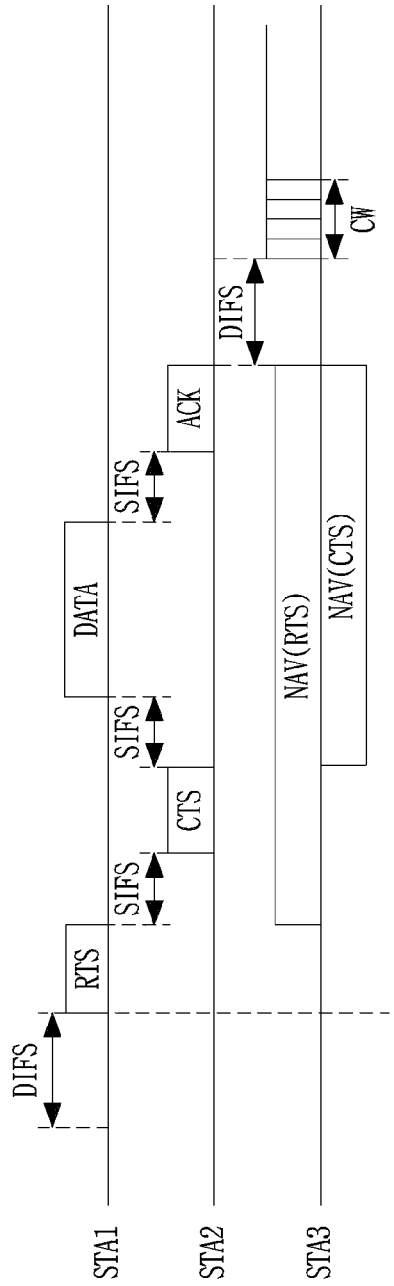
FIG. 5 is a conceptual diagram illustrating a procedure for transmitting a frame in Carrier Sense Multiple Access with Collision Avoidance (CSMA/CA) to avoid collision between frames on a channel.

FIG. 5 is a conceptual diagram illustrating a CSMA/CA-based frame transmission procedure to avoid collision between frames on a channel.

Referring FIG. 5, a first STA (STA1) is a transmitting WLAN device having data to be transmitted, a second STA (STA2) is a receiving WLAN device to receive the data from STA1, and a third STA (STA3) is a WLAN device located in an area where STA3 may receive a frame from STA1 and/or STA2.

STA1 may determine whether a channel is busy by carrier sensing. STA1 may determine channel occupancy based on an energy level of the channel or a correlation between signals on the channel, or using a Network Allocation Vector (NAV) timer.

If STA1 determines that the channel is not used by other devices during a DIFS (that is, the channel is idle), STA1 may transmit an RTS frame to STA2 after performing a backoff. Upon receipt of the RTS frame, STA2 may transmit a CTS frame as a response to the CTS frame after a SIFS.

Upon receipt of the RTS frame, STA3 may set a NAV timer for a transmission duration of following frames (e.g., a SIFS time+a CTS frame duration+a SIFS time+a data frame duration+a SIFS time+an ACK frame duration), based on duration information included in the RTS frame. Upon receipt of the CTS frame, STA3 may set the NAV timer for a transmission duration of following frames (e.g., a SIFS time+a data frame duration+a SIFS time+an ACK frame duration), based on duration information included in the CTS frame. Upon receipt of a new frame before the NAV timer expires, STA3 may update the NAV timer based on duration information included in the new frame. STA3 does not attempt to access the channel until the NAV timer expires.

Upon receipt of the CTS frame from STA2, STA1 may transmit a data frame to STA2 a SIFS after the CTS frame has been completely received. Upon successful receipt of the data frame from STA1, STA2 may transmit an ACK frame as a response to the data frame after a SIFS.

Upon expiration of the NAV timer, STA3 may determine whether the channel is busy by carrier sensing. If STA3 determines that the channel is not in use by the other devices during a DIFS after expiration of the NAV timer, STA3 may attempt channel access after a convention window according a random backoff-based CW.

Figure 6:
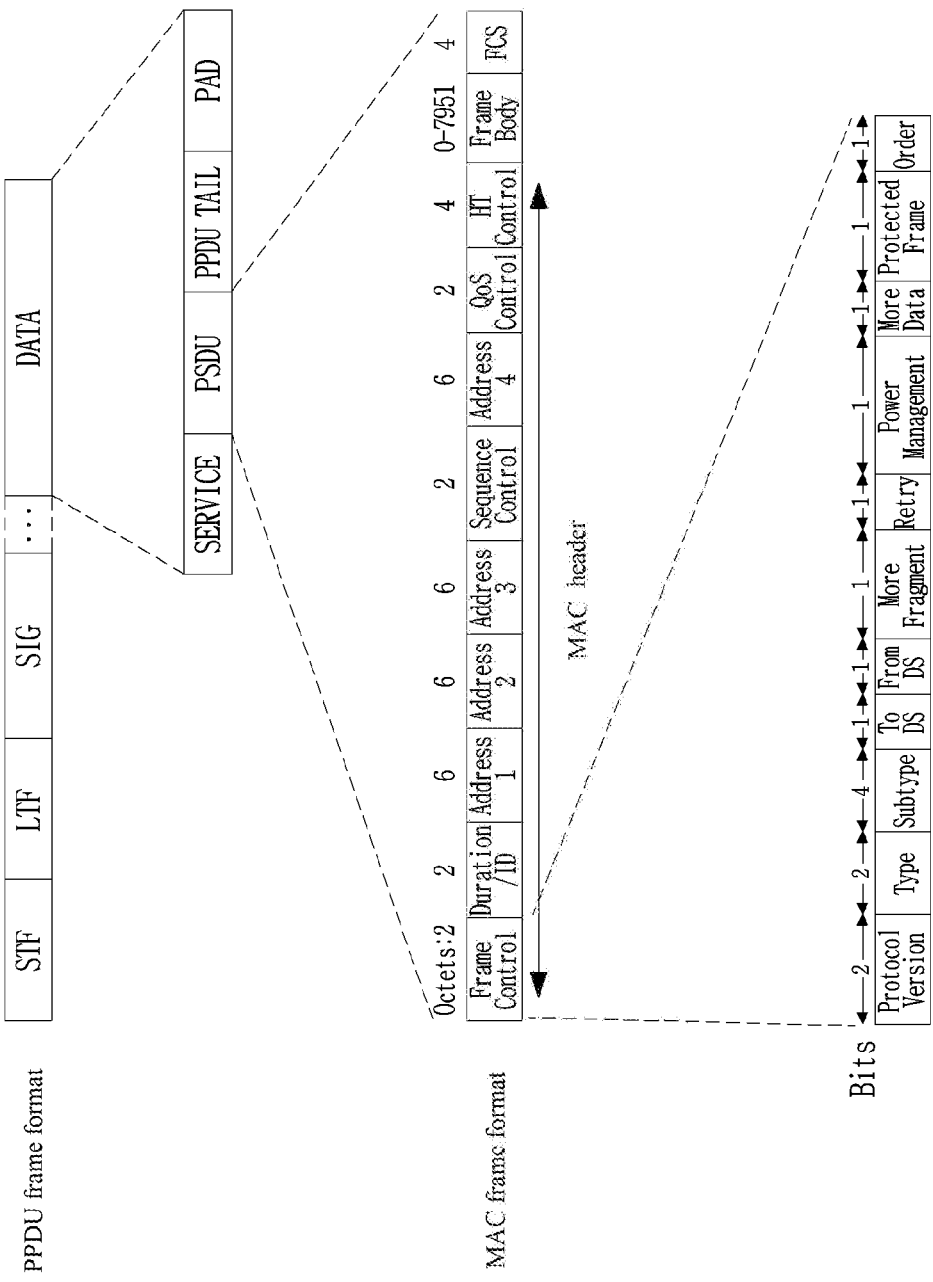
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
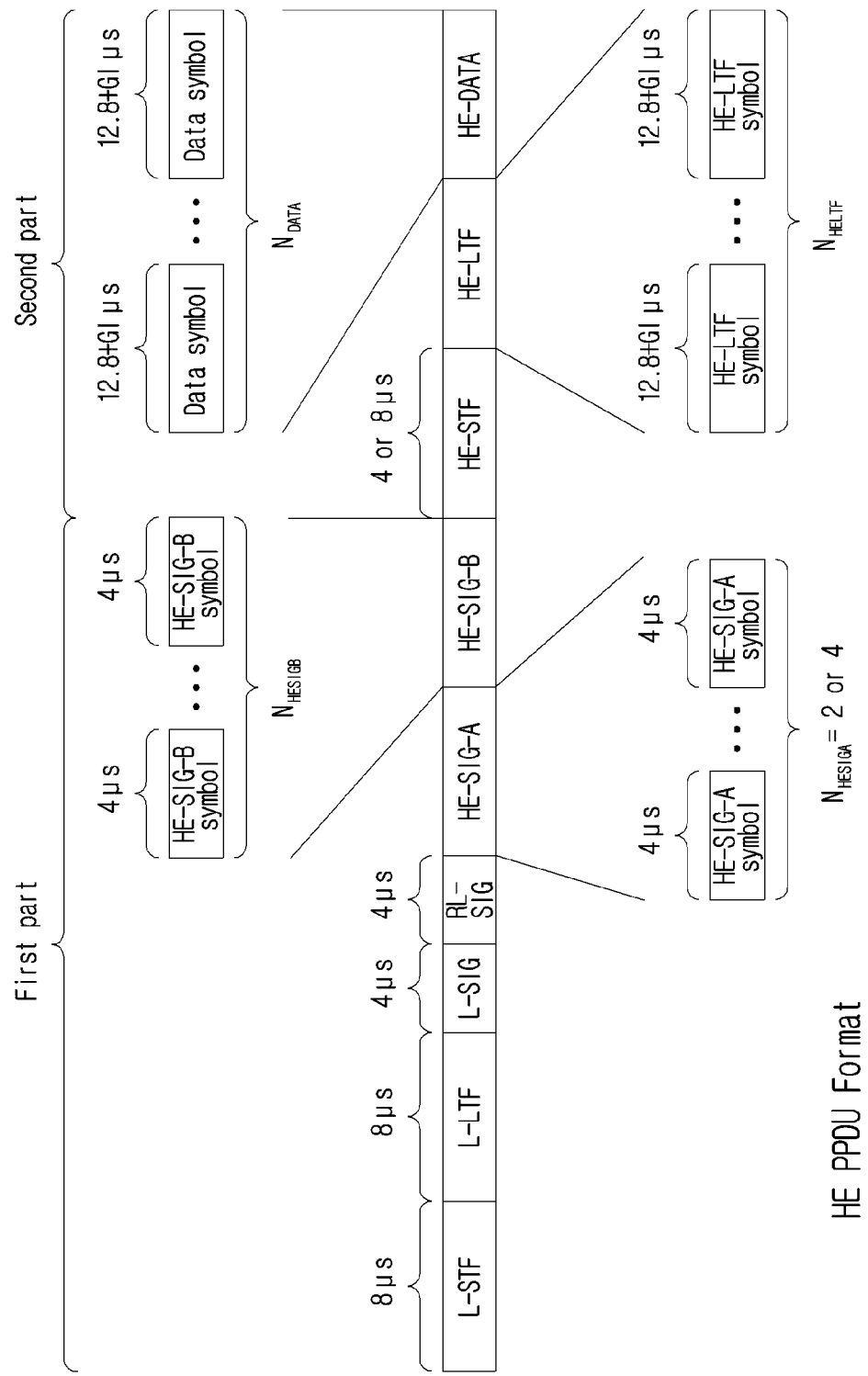
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may detect a PPDU and then process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include NHESIGA symbols, the HE-SIG-B field may include NHESIGB symbols, the HE-LTF field may include NHELTF symbols, and the HE-DATA field may include NDATA symbols.

A detailed description of the fields included in the HE PPDU frame format is given in Table 1.

TABLE 1

| Element | definition | duration | DFT period | GI | Subcarrier spacing | Description |
| --- | --- | --- | --- | --- | --- | --- |
| Legacy(L)-STF | Non-high throughput(HT) Short Training field | 8 μs | — | — | equivalent to 1.250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |

TABLE 1-continued

| Element | definition | duration | DFT period | GI | Subcarrier spacing | Description |
|---|---|---|---|---|---|---|
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: (equivalent to) 15.65 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTE symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of NHESIGA*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. NHESIGA represents the number of OFDM symbols of the HE-SIG-A field and may have a value of 2 or 4.

HE-SIG-B is a HE SIGNAL B field and may have a duration of NHESIGB*4 μs, a DFT period of 3.2 μs, a GI of 0.8 μs, and a subcarrier spacing of 312.5 kHz. NHESIGB represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of NHELTF*(DFT period+GI)μs. NHELTF represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 µs excluding a GI and then eliminating the first half or the second half of the OFDM symbol in the time domain. In the 4×LTF mode, a HE-LTF symbol excluding a GI are equivalent to a symbol obtained by modulating every fourth tone in an OFDM symbol of 12.8 µs excluding a GI and then eliminating the first three-fourths or the last three-fourths of the OFDM symbol in the time domain. 2×LTF may have a DFT period of 6.4 µs and 4×LTF may have a DFT period of 12.8 µs. A GI of HE-LTF may support 0.8 µs, 1.6 µs, and 3.2 µs. 2×LTF may have a subcarrier spacing equivalent to 156.25 kHz and 4×LTF may have a subcarrier spacing of 78.125 kHz.

HE-DATA is a HE DATA field and may have a duration of, NDATA*(DFT period+GI)µs. NDATA represents the number of HE-DATA symbols. HE-DATA may have a DFT period of 12.8 µs. A GI of HE-DATA may support 0.8 µs, 1.6 µs, and 3.2 µs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
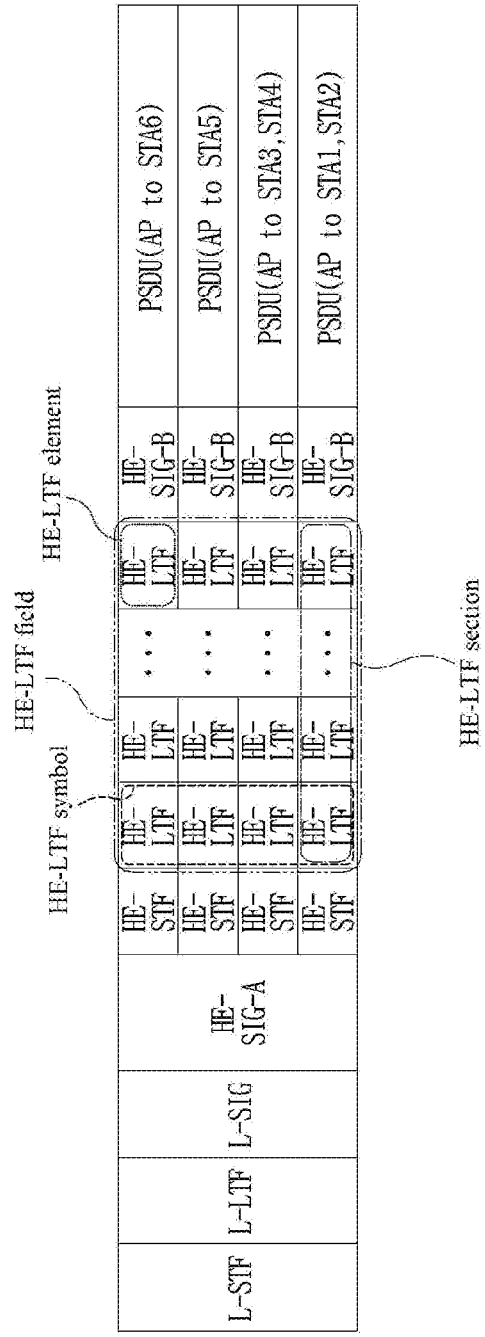
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
| --- | --- | --- | --- | --- |
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |

TABLE 2-continued

| Two parts of VHT-SIG-A | Bit | Field | Number of bits | Description |
|---|---|---|---|---|
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1 , . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSIT1ON[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user it with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1.<br>B7 is reserved and set to 1 |
| | B8 | Beamformed | 1 | For a VHT SU PPDU:<br>Set to 1 if a Beamforming steering matrix is applied to the waveform in an SU transmission as described in 20.3.11.11.2, set to 0 otherwise.<br>For a VHT MU PPDU:<br>Reserved and set to 1<br>NOTE—if equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of |

TABLE 2-continued

| Two parts of VHT-SIG-A | Bit | Field | Number of bits | Description |
|---|---|---|---|---|
| | | | | HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present disclosure, the HE-SIG-A field may include one or more of the fields included in the VHT-SIG-A field, and it may provide backward compatibility with IEEE 802.11ac stations.

Figure 9:
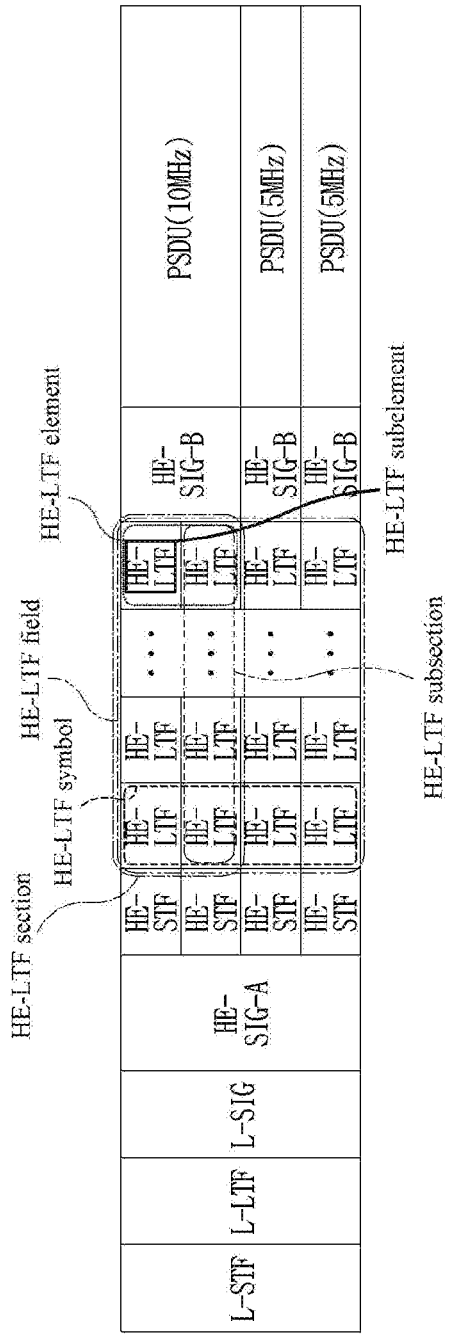
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of a intermediate subchannel of one channel to a STA.

Figure 10:
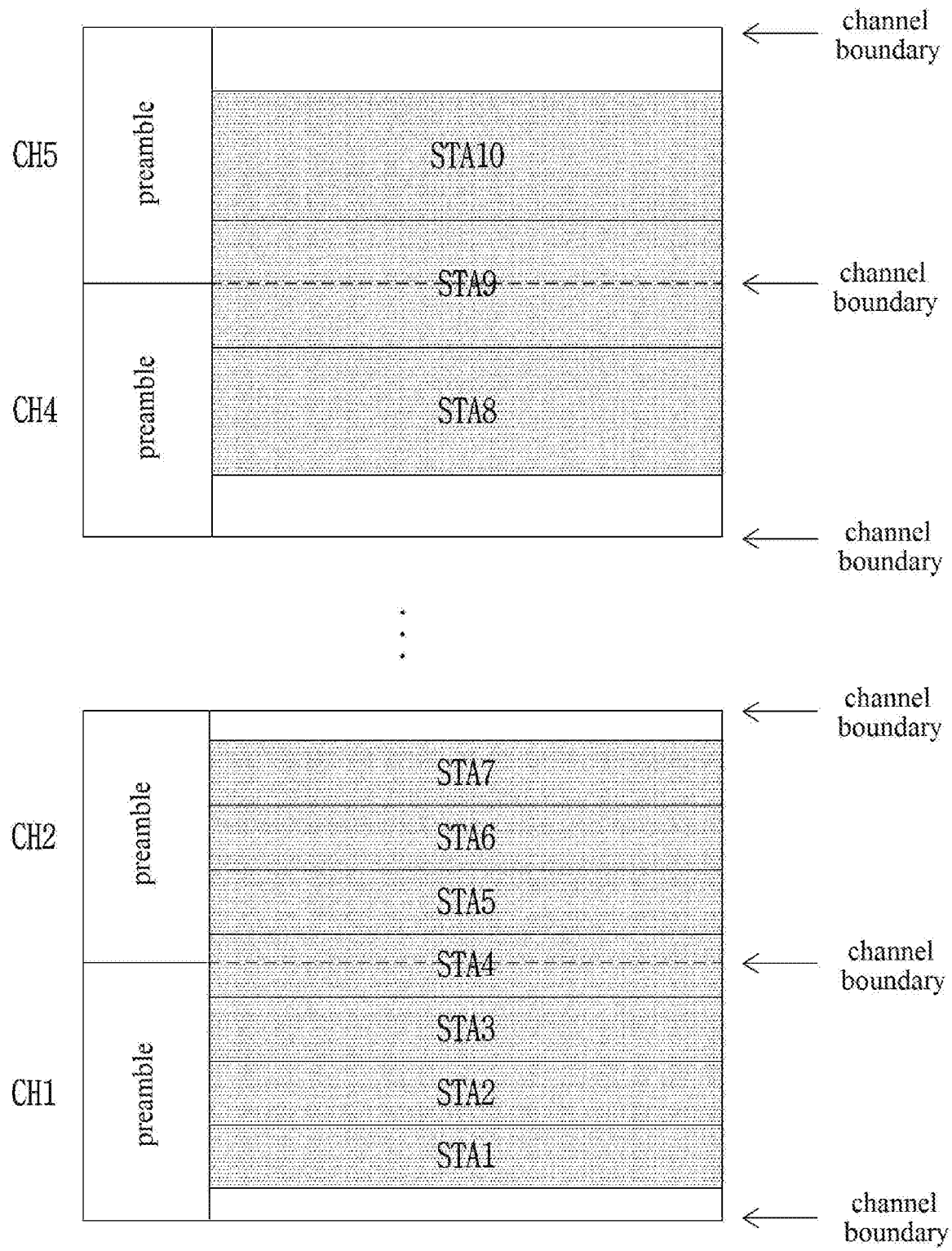
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present disclosure, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present disclosure, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

Figure 11:
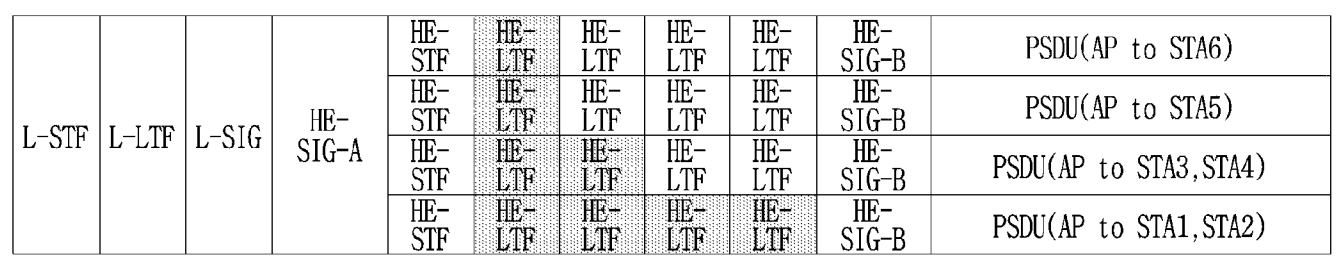

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present disclosure, relationship between a total number of spatial streams transmitted on one subchannel and a number of HE-LTFs is listed in [Table 3].

TABLE 3

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

Figure 13:
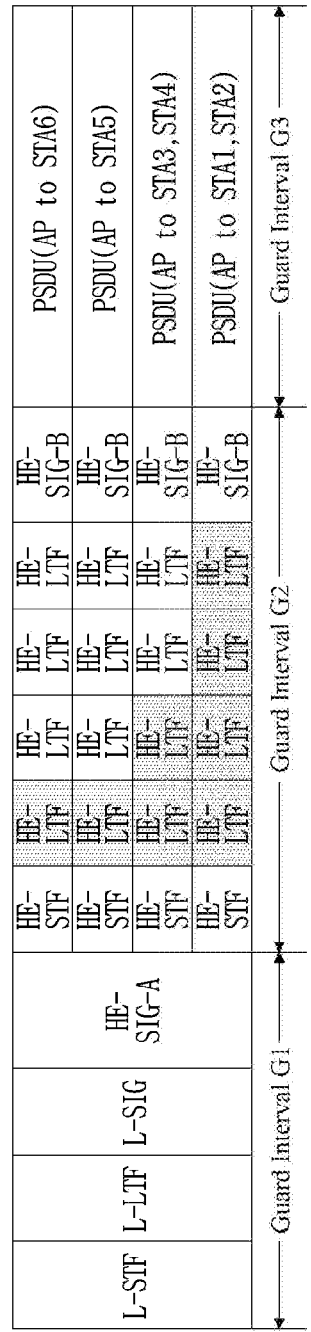
FIG. 13 depicts another example of a HE PPDU frame format according to the present disclosure.

FIG. 13 depicts OFDM symbol durations and GI lengths in the HE PPDU frame format according to the present disclosure.

In the HE PPDU frame format according to the present disclosure, L-STF, L-LTF, L-SIG, and HE-SIG-A fields may be configured with 4.0-µs OFDM symbols based on 64-FFT. One OFDM symbol has a GI of 0.8 µs. In the present disclosure, a GI value applied to the L-STF, L-LTF, L-SIG, and HE-SIG-A fields is defined as G1. The L-STF, L-LTF, L-SIG, and HE-SIG-A fields may include 3.2-µs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 µs and a subcarrier spacing of 312.5 kHz.

The following HE-STF, HE-LTF, HE-SIG-B, and PSDU fields may include 16-µs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-µs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 µs and a subcarrier spacing of 78.125 kHz.

The values of G2 and G3 may be equal or different. If G2 and G3 are equal, G2 and G3 may be defined as one parameter without distinguishing between G2 and G3. Unlike G1, G2 and G3 may vary according to a transmitted PPDU transmission vector, rather than they are fixed values (i.e., predetermined values). This is related to that the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 µs, G2 may be a value selected from 3.2 µs, 1.6 µs, 0.8 µs, and 0.4 µs, and G3 may be a value selected from among 3.2 µs, 1.6 µs, 0.8 µs, and 0.4 µs. Also, G1 may have a fixed value (i.e., a predetermined value) of 0.8 µs, and G2 or G3 may be a value selected or determined from among 3.2 µs, 1.6 µs, 0.8 µs, and 0.4 µs. G1 does not require separate signaling because G1 is a fixed value, and signaling information indicating G2 and G3 may be provided in the HE-SIG-A field to a HE STA.

G2 and G3 are applied commonly across all OFDM symbols transmitted during a corresponding time period and across all subchannels. Accordingly, PSDU transmission timings and OFDM symbol timings may be synchronized. For example, it is not allowed to apply a 3.2-µs G2 value to a subchannel and a 1.6-µs or 0.8-µs G2 value to another subchannel during a specific time period. Rather, the same 3.2-µs G2 value may be applied to the subchannels during the same time period. In a similar example, it is not allowed to apply a 1.6-µs G3 value to a subchannel and a 3.2-µs or 0.8-µs G3 value to another subchannel during a specific time period. Rather, the same 1.6-µs G3 value may be applied to the subchannels during the same time period.

In the case where a HE PPDU frame format having HE-LTF sections of different lengths for subchannels is used (i.e., in the case where the number of HE-LTFs is not determined for each subchannel based on the maximum of the numbers of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where a HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value.

In the example of FIG. 3, OFDM symbol durations S1, S2, and S3 may be applied respectively to time periods to which the GIs G1, G2, and G3 are applied.

Figure 14:
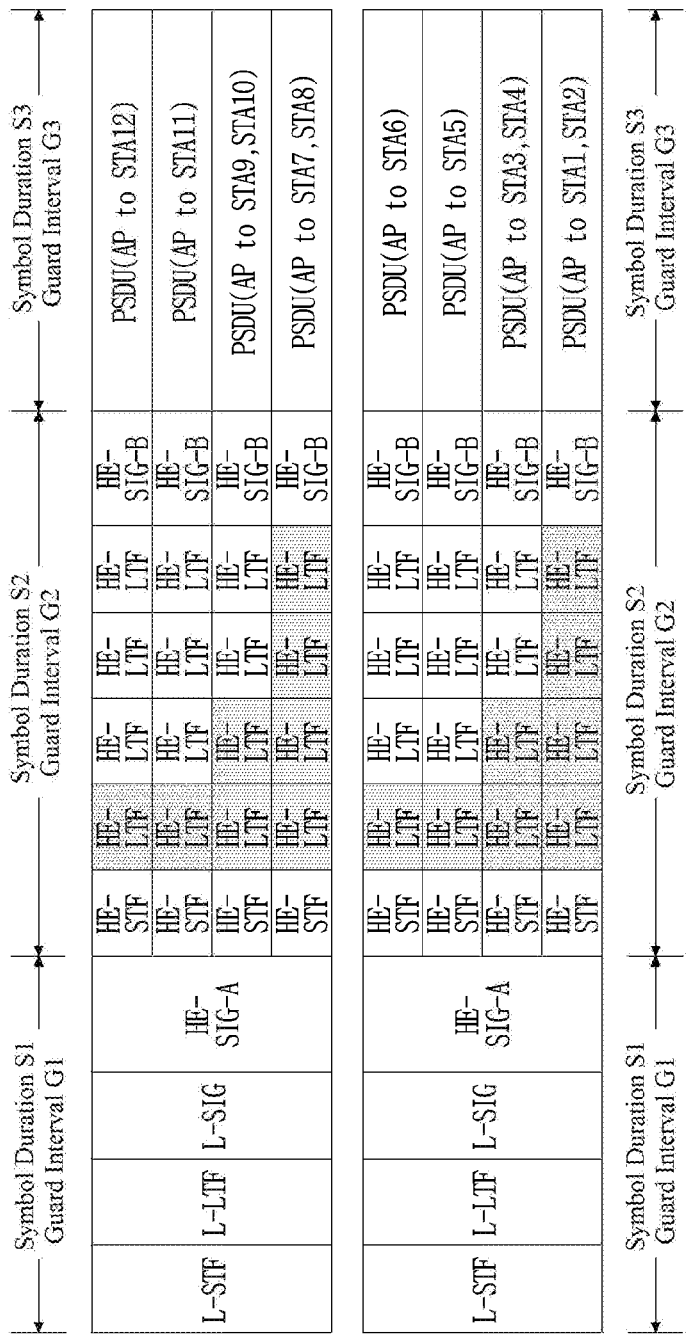
FIG. 14 depicts an exemplary HE PPDU frame format for a wide channel band according to the present disclosure.

FIG. 14 depicts an exemplary HE PPDU frame format for a wide channel band according to the present disclosure.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the numbers of HE-LTFs to be transmitted on all subchannels may be determined according to the maximum of the numbers of HE-LTFs required according to the total numbers of spatial streams transmitted on each subchannels over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO-mode or OFDMA-mode transmission of a HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz subchannel are S1 and G1, respectively. Like the first 20-MHz subchannel, the first 20-MHz subchannel has S1 and G1 respectively as the OFDM symbol duration and GI of L-STF, L-LTF, L-SIG, and HE-SIG-A fields.

In FIG. 14, a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and a HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example means that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modification example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel are the same fixed values in every 20-MHz channel.

Further, this modification example may include application of the example described before with reference to FIG. 11 in which 'subchannels have the same HE-LTF section length' only to subchannels within one 20-MHz channel, not to the HE-LTF section length of subchannels in another 20-MHz channel.

With reference to the foregoing examples of the present disclosure, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 15 may be used for a UL HE PPDU transmission.

Figure 15:
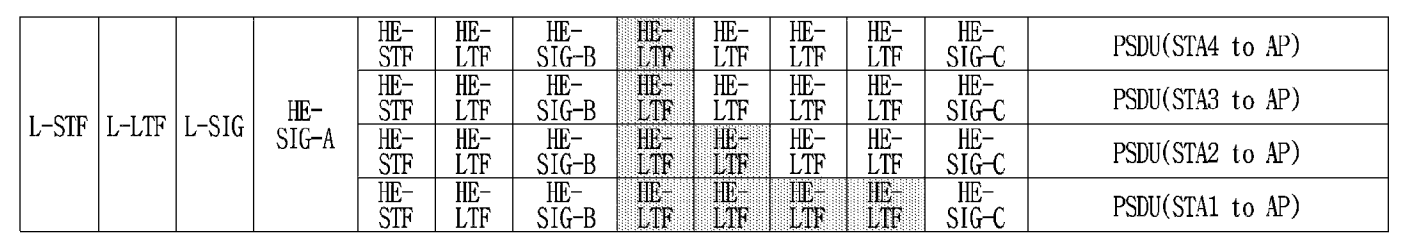

FIG. 15 depicts another exemplary HE PPDU frame format according to the present disclosure. The HE PPDU frame format illustrated in FIG. 15 is characterized in that a structure of HE-SIG-A, HE-SIG-B, and HE-SIG-C fields similar to in FIG. 11 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 15 may not exist. In this case, a description of each field given below may be applied only in the presence of the field.

In the example of FIG. 15, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-µs OFDM symbols based on 64-FFT. One OFDM symbol has a GI of 0.8 µs. In the present description, A GI value applied to the L-STF, L-LTF, L-SIG, and HE-SIG-A fields is defined as G1. Excluding the GI, the L-STF, L-LTF, L-SIG, and HE-SIG-A fields may be configured as 3.2-µs OFDM symbols based on 64-FFT.

In the example of FIG. 15, a HE-STF field, a HE-LTF field, a HE-SIG-B field, HE-LTF elements(s) in a HE-LTF section, HE-SIG-C field and a PSDU may include 16-μs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. Unlike G1, G2 and G3 may vary according to each transmitted PPDU transmission vector, rather than they are fixed values (i.e. predetermined values known to both a transmitter and a receiver). This is related to the fact that the lengths of the HE-STF, the HE-LTF, the HE-SIG-B, the HE-LTF element(s) in a HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, G1 may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, G1 may be a fixed value (i.e. a predefined value known to both a transmitter and a receiver) of 0.8 μs, and G2 or G3 may be a value selected or indicated from among 3.2 μs, 1.6 μs, 0.8 μs, and 0.4 μs. G1 does not require signaling because G1 is a fixed value, and signaling information indicating G2 and G3 may be provided to the AP. If a HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that, if a 3.2-μs G2 value is applied to a subchannel during a specific time period, a 1.6-μs or 0.8-μs G2 value is applied to other subchannels during the same time period. Rather, the same 3.2-μs G2 value may be applied to other subchannels during the same time period. In a similar example, it is not allowed that, if a 1.6-μs G3 value is applied to a subchannel during a specific time period, a 3.2-μs or 0.8-μs G3 value is applied to other subchannels during the same time period. Rather, the same 1.6-μs G3 value may be applied to other subchannels during the same time period.

In the case where a HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values may need to be selected or indicated as G2 and G3 in this case.

In the case where a HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values as G2 and G3 does not cause a problem. However, even in this case, selection or indication of the same values as G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Hereinafter, examples of the present disclosure for applying beamforming and acquiring Channel State Information (CSI) in HE PPDU transmission for DL/UL MU transmission will be described. Beamforming transmission may mean a transmission scheme for controlling directions of beams to each STA and the CSI may include channel state information needed to calculate a beamforming steering matrix. Specifically, a description will be given of a HE PPDU frame configuration when beamforming is applied for DL/UL MU transmission, a procedure for a beamformer (i.e., a transmitter of a beamformed signal) to acquire the CSI from a beamformee (i.e., a receiver of the beamformed signal), and a frame configuration used for the CSI acquisition procedure.

According to the present disclosure, in DL MU transmission or UL MU transmission, whether beamforming is applied to a plurality of subchannels (or a plurality of STAs) in a HE PPDU transmitted over one transmission channel divided into the plurality of subchannels may be identically or differently configured.

In addition, information indicating whether beamforming is applied to each subchannel (or each STA) may be included in a HE-SIG field in a HE PPDU format supporting beamforming in DL MU transmission or UL MU transmission. Further, information directly or indirectly indicating whether beamforming is applied to each subchannel (or each STA) may be included in a trigger frame triggering UL MU transmission in order to support beamforming in UL MU transmission.

According to the present disclosure, an AP may simultaneously receive CSI from a plurality of STAs for beamformed DL MU transmission. For the AP to acquire the CSI from the multiple STAs, an NDP sounding procedure may be performed. The AP may determine whether beamforming is applied to the multiple STAs (or multiple subchannels allocated to the multiple STAs) based on the CSI acquired from the multiple STAs.

Hereinafter, various embodiments of the present disclosure for beamforming support in a HE PPDU will be described in more detail.

Figure 16:
FIGS. 16 and 17 depict exemplary HE PPDU frame formats supporting beamforming according to the present disclosure.
Figure 17:

FIGS. 16 and 17 depict exemplary HE PPDU frame formats supporting beamforming according to the present disclosure.

In the example of FIG. 16, an AP corresponding to a beamformer transmits PSDUs over subchannels allocated respectively to STA1, STA2, STA3, and STA4 corresponding to beamformees. Signaling information indicating whether beamforming is applied to a PSDU over each subchannel may be included in a HE-SIG-A field of a HE PPDU.

Whether beamforming is applied to each of multiple subchannels in one channel may be individually or independently determined. That is, beamforming may be identically or differently applied to multiple subchannels (or multiple STAs). In this case, signaling bits having the same size as the number of subchannels are needed. For example, whether beamforming is applied to each of N subchannels may be indicated by N-bit signaling information and a bit value (i.e., 0 or 1) of a bit position of each of N bits may indicate that beamforming is not applied or is applied to one subchannel.

Alternatively, whether beamforming is applied to a plurality of subchannels in one channel may be commonly determined. That is, beamforming may be identically applied or may not be identically applied to all the subchannels. In this case, the signaling information may have a size of one bit.

In the example of FIG. 16, an AP corresponding to a beamformer transmits PSDUs over subchannels allocated respectively to STA1, STA2, STA3, and STA4 corresponding to beamformees. Signaling information indicating whether beamforming is allocated to a PSDU over each subchannel may be included in a HE-SIG-B field of a HE PPDU.

If the HE-SIG-B field is transmitted over each subchannel, 1-bit signaling information indicating whether beamforming is applied to a corresponding subchannel may be included in one HE-SIG-B field. Whether beamforming is applied to each of multiple subchannels may be individually or independently determined.

If the HE-SIG-B field is commonly transmitted over the multiple subchannels, N-bit signaling information individually indicating whether beamforming is applied to N subchannels or 1-bit signaling information commonly indicating whether beamforming is applied to the N subchannels may be included in the HE-SIG-B field.

In this way, the signaling information indicating whether beamforming is applied to the multiple subchannels may be included in a HE-SIG field (e.g., the HE-SIG-A or HE-SIG-B field). More specifically, the signaling information indicating whether beamforming is applied to the multiple subchannels may be included in the HE-SIG field transmitted prior to a HE-LTF field. A HE-LTF section in each subchannel is used for channel estimation of the corresponding subchannel and channel estimation may vary according to whether beamforming is applied to the subchannel. Therefore, the information indicating whether beamforming is applied may be transmitted at least before the HE-LTF field (or before a HE-STF field).

In addition, in beamformed HE PPDU transmission, a beamforming steering matrix may be applied to a transmission signal waveform and, in this case, smoothing may not be applied. Smoothing refers to acquisition of noise suppression gain in consideration of a neighboring subcarrier signal in channel estimation, using a high channel correlation between adjacent subcarriers in a channel environment in which delay spread is low. In beamformed HE PPDU transmission, since a channel correlation between adjacent subcarriers may not be maintained, channel estimation performed by reflecting an adjacent subcarrier signal through smoothing may not necessarily ensure noise suppression. Specifically, if whether beamforming is applied to each of multiple subchannels in beamformed HE PPDU transmission is individually or independently determined, subchannels to which beamforming is not applied and subchannels to which beamforming is applied may be adjacent to each other and, in this case, smoothing may not be applied to adjacent subcarriers over a subchannel boundary.

Thus, a certain STA may not apply smoothing to subcarrier(s) located at a boundary of subcarriers allocated thereto. For example, in the example of FIG. 16 or 17, if STA2 is not aware of whether beamforming is applied to other subchannels (e.g., a subchannel allocated to STA1 and a subchannel allocated to STA3) adjacent to a subchannel allocated to STA2, STA2 may not apply smoothing to subcarriers located at a subcarrier boundary (i.e., subcarriers adjacent to the subchannel allocated to STA1 and subcarriers adjacent to the subchannel allocated to STA3) in the subchannel allocated to STA2.

Figure 18:
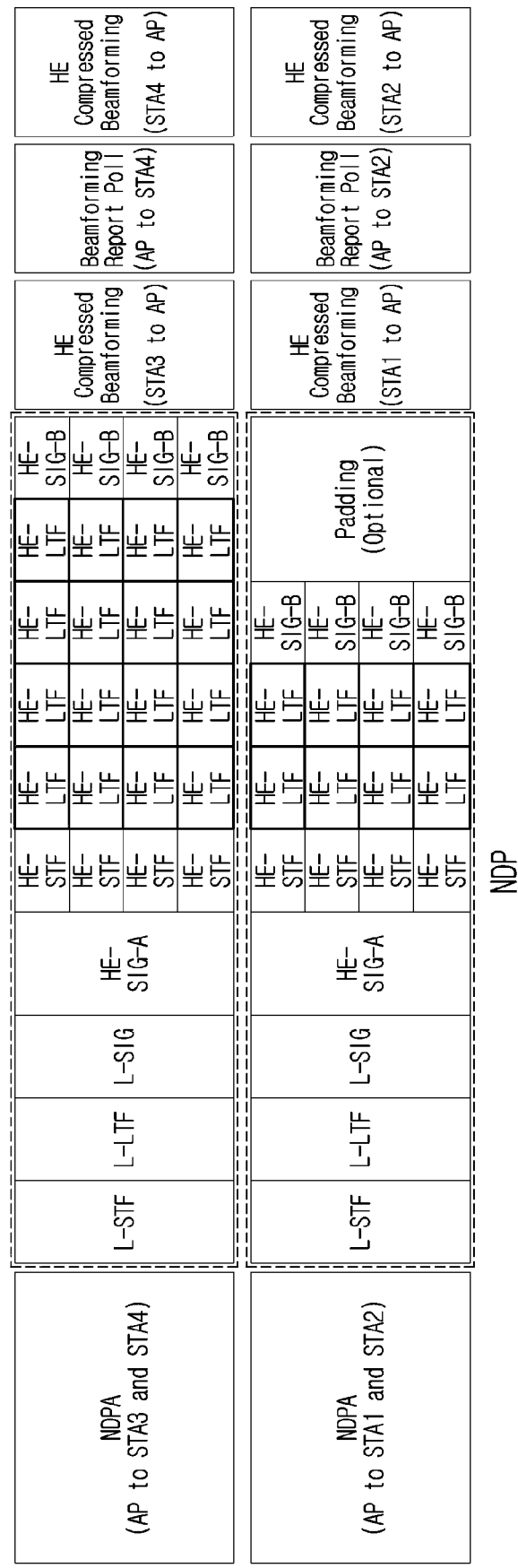
FIG. 18 depicts an exemplary sounding protocol according to the present disclosure.

FIG. 18 depicts an exemplary sounding protocol according to the present disclosure.

A sounding protocol is a procedure in which an AP acquires feedback information about CSI between the AP and an STA from the STA in order for the AP to perform beamforming transmission to the STA. Through the sounding procedure, the AP may transmit an NDP frame (i.e., a PPDU frame having a PSDU of length 0) to the STA and the STA may determine the CSI based on the NDP frame and transmit a determined result (i.e., feedback information) to the AP. The CSI determined based on the NDP frame may be fed back to the AP that has requested sounding through a compressed beamforming frame. The NDP frame transmitted by the AP may be received by a plurality of STAs and the AP may acquire the feedback information from each STA.

Prior to transmission of the NDP frame by the AP, an NDP Announcement (NDPA) frame may be transmitted. The NDPA frame is a PPDU frame indicating that the NDP frame immediately follows the NDPA frame (e.g., that the NDP frame will be transmitted after an SIFS from an end time point of the NDPA frame). The first STA of an STA list included in the NDPA frame may receive the NDP frame even without receiving an additional polling frame (e.g. a Beamforming Report Polling frame) from the AP and then immediately transmit a feedback frame to the AP (e.g., after an SIFS from a reception end time point of the NDP frame). The other STAs included in the NDPA frame may receive the polling frame (e.g., the Beamforming Report Poll frame) from the AP and then immediately transmit the feedback frame to the AP (e.g., after an SIFS from a reception end time point of the polling frame). Herein, the polling frame may be transmitted from the AP to an STA immediately after a compressed beamforming frame from the STA is ended (e.g., after an SIFS from an end time point of the compressed beamforming frame).

The NDPA frame should be transmitted so as to be received by target STAs of the sounding procedure. Therefore, beamforming may not be applied to transmission of the NDPA frame (i.e. the NDPA frame may be omnidirectionally transmitted).

In this way, since both the NDP frame and the Beamforming Report Poll frame, transmitted by an STA (e.g., an AP) requesting feedback in the sounding procedure, have features in common in that they are frames for triggering the feedback frame from target STAs (e.g., STA1, STA2, STA3, and STA4) of the sounding procedure, the NDP frame and the Beamforming Report Poll frame may be collectively referred to as feedback trigger frames.

In the example of FIG. 18, an AP corresponding to a beamformer transmits the NDPA frame to STA1, STA2, STA3, and STA4 corresponding to beamformees and transmits the NDP frame (i.e. the PPDU frame only including a legacy preamble (i.e., an L-STF, an L-LTF, and L-SIG field) and a HE-preamble (i.e. a HE-SIG-A field, a HE-STF, and HE-LTF)) after an SIFS. STA1, STA2, STA3, and STA4 corresponding to the beamformees may be aware that they are target STAs of NDP sounding by receiving the NDPA frame and the NDP frame and perform channel estimation using the NDP frame. After receiving the feedback trigger frame (e.g., the NDP frame or the Beamforming Report Poll frame), each STA transmits the result (e.g., CSI) of channel estimation to the AP through a HE compressed beamforming frame after an SIFS.

In the example of FIG. 18, a plurality of STAs simultaneously transmits HE compressed beamforming frames (e.g., frames including the CSI).

Specifically, in the example of FIG. 18, it is assumed that beamformee Space Time Stream (STS) capabilities of STA1 and STA2 indicate that a maximum of two STSs is supported and beamformee STS capabilities of STA3 and STA4 indicate that a maximum of four STSs is supported. In this case, the NDP frame cannot request channel estimation for STSs exceeding the number of beamformee STS capabilities. For example, if beamformee STS capabilities indicate that a maximum of two STSs is supported, the NDP frame transmitted by the beamformer may request channel estimation for the two STSs and cannot request channel estimation for more than two STSs (e.g., 3, 4, 5, 6, 7, or 8 STSs).

Since the number of HE-LTFs in the HE PPDU is determined based on the number of STSs as described above, the number of HE-LTFs used for channel estimation for STSs in the NDP frame may be determined based on the beamformee STS capabilities. That is, as in the example of FIG. 18, the NDP frame for STA1 and STA2 supporting a maximum of two STSs may include two HE-LTFs and the NDP frame for STA3 and STA4 supporting a maximum of four STSs may include four HE-LTFs.

Furthermore, in NDP sounding according to the present disclosure, simultaneously performing NDP sounding with respect to STAs having different beamformee STS capabilities may be supported. As in the example of FIG. 18, NDP sounding over a low channel (e.g., one 20 MHz channel of a low frequency side out of two 20 MHz channels constituting a 40 MHz channel when NDP sounding is performed over a 40 MHz channel in FIG. 18) for STA1 and STA2, beamformee STS capabilities of which support two STSs, and NDP sounding over a high channel (e.g., one 20 MHz channel of a high frequency side out of two 20 MHz channels constituting a 40 MHz channel) for STA3 and STA4, beamformee STS capabilities of which support four STSs, may be simultaneously performed.

Specifically, in the example of FIG. 18, the AP may request that STAs transmit CSI on a channel (or subchannel) basis and receive the CSI. For example, the AP may perform NDP sounding using a 40 MHz channel with respect to STA1, STA2, STA3, and STA4. In this case, the AP may transmit the NDPA frame and the NDP frame over a low 20 MHz channel for the purpose of requesting that STA1 and STA2 transmit the CSI for a low 20 MHz channel and then the AP may receive the CSI of a low 20 MHz channel through the compressed beamforming frame from STA1 and STA2. At the same time, the AP may transmit the NDPA frame and the NDP frame over a high 20 MHz channel for the purpose of requesting that STA3 and STA4 transmit CSI for a high 20 MHz channel and then the AP may receive the CSI of a high 20 MHz channel through the compressed beamforming frame from STA3 and STA4.

The NDPA frame transmitted over a low channel may include STA1 and STA2 in an NDP sounding target STA list and the NDPA frame transmitted over a high channel may include STA3 and STA4 in the NDP sounding target STA list. The NDPA frames over a low channel and a high channel may be simultaneously transmitted.

The NDP frame transmitted after an SIFS from an NDPA frame end time point over a low channel may include two HE-LTFs for channel estimation for two STSs corresponding to beamformee STS capabilities of STA1 and STA2. The NDP frame transmitted after an SIFS from an NDPA frame end time point over a high channel may include four HE-LTFs for channel estimation for four STSs corresponding to beamformee STS capabilities of STA3 and STA4. The NDP frames over a low channel and a high channel may be simultaneously transmitted.

If the number of HE-LTFs of the NDP frame transmitted over a low channel is different from that of the NDP transmitted over a high channel, transmission times of the NDP frames (i.e. NDP frame end time points) may be different. In this case, HE compressed beamforming frames transmitted as an immediate response to the NDP frames may become different over a low channel and a high channel.

To simultaneously transmit the HE compressed beamforming frames over a low channel and a high channel, the transmission times of the NDP frames (i.e., lengths of the NDP frames) over a plurality of channels may be set to be equal. To equally match the length of the NDP frame transmitted over a low channel with the length of the NDP frame transmitted over a high channel as in the example of FIG. 18, a padding field may be included in the NDP frame transmitted over a low channel after a HE preamble. The padding field may correspond to additional transmission of a field of the HE preamble (e.g., a HE-LTF field or a HE-SIG-B field) or may be configured by a signal having a predetermined pattern. If the padding field is added to any NDP frame, the length of the padding field may be set to a length difference between any NDP frame and another simultaneously transmitted NDP frame (e.g., difference between the length of the NDP frame transmitted over a high channel and the length of the NDP frame transmitted over a low channel).

FIG. 19 depicts an exemplary NDPA frame format according to the present disclosure.

In the example of FIG. 19, a frame format of an MPDU included in a PSDU of a PPDU (or a HE PPDU) corresponding to an NDPA is illustrated.

A Receiver Address (RA) field may be set to an address of a receiving STA of a corresponding frame. If an NDPA frame includes one STA Information (Info) field, the RA field may be set to an address of a corresponding STA. If the NDPA frame includes a plurality of STA Info fields, the RA field may be set to a broadcast address.

A Transmitter Address (TA) field may be set to an address of a transmitting STA of a corresponding frame.

A Sounding Dialog Token field may be set to a value selected by a beamformer (e.g., an AP) in order to identify the NDPA frame.

The STA Info field may include information for designating beamformee(s) corresponding to a target STA of NDP sounding. The NDPA frame may include one or multiple STA Info fields.

One STA Info field may include at least one of an Association Identifier (AID) subfield, a Feedback Type subfield, an Nc Index subfield, an Nr Index subfield, a Grouping subfield, and a Codebook Information subfield.

The AID subfield (e.g., 12-bit size) may include 12 Least Significant Bits (LSBs) of an AID of an STA that is expected to prepare sounding feedback by processing an NDP frame following the NDPA frame. If the STA is an AP, a mesh STA, or a member of an IBSS, the AID subfield may be set to a value of 0.

The Feedback Type subfield (e.g., 1-bit size) may indicate a requested feedback type. If the Feedback Type subfield is set to 0, this may indicate SU type feedback and, if the Feedback Type subfield is set to 1, this may indicate MU type feedback.

The Nc Index subfield (e.g., 3-bit size) may be set to a value obtained by subtracting one from the number of columns of a Compressed Beamforming Feedback Matrix subfield. If Nc=1, 2, 3, . . . , 8, then the Nc Index subfield may be set to a value of 0, 1, 2, . . . , 7, respectively.

Herein, the Compressed Beamforming Feedback Matrix subfield may be included in a Compressed Beamforming Report field of a HE Compressed Beamforming frame and may include information about a compressed beamforming feedback matrix to be applied to a specific subcarrier. The compressed beamforming feedback matrix may have a plurality of rows and one or more columns and elements of the matrix may indicate respective specific angles. The compressed beamforming feedback matrix fed back through the Compressed Beamforming Report field may be used for a transmission beamformer to determine a steering matrix.

The Nr Index subfield (e.g., 3-bit size) may be set to a value obtained by subtracting one from the number of rows of the compressed beamforming feedback matrix. If Nr=1, 2, 3, . . . , 8, then the Nr Index subfield may be set to a value of 0, 1, 2, . . . , 7, respectively.

The Grouping subfield (e.g., 2-bit size) may be set to a value indicating a subcarrier grouping level, i.e., Ng, used for the compressed beamforming feedback matrix. If Ng=1 (i.e., if there is no subcarrier grouping), the Grouping subfield may be set to a value of 0. If Ng=2 (i.e., if only one compressed beamforming feedback matrix is reported with respect to a group including two adjacent subcarriers), the Grouping subfield may be set to a value of 1. If Ng=4 (i.e., if only one compressed beamforming feedback matrix is reported with respect to a group including four adjacent subcarriers), the Grouping subfield may be set to a value of 2. The Grouping subfield set to a value of 3 may be reserved.

The Codebook Information subfield (e.g., 1-bit size) may be set to a value indicating the size of a codebook entry.

Upon receiving the NDPA frame and the NDP frame following the NDPA frame, configured as described above, beamformees (e.g., STAs) may transmit a plurality of HE compressed beamforming frames to a beamformer (e.g., AP) over channels receiving the NDPA and the NDP.

Herein, the multiple HE compressed beamforming frames transmitted by the multiple beamformees (e.g., multiple HE compressed beamforming frames as an immediate response to the NDP frame or multiple HE compressed beamforming frames transmitted as an immediate response to the Beamforming Report Poll frame) may be simultaneously transmitted based on configuration by the beamformer. That is, the multiple beamformees may simultaneously transmit the multiple HE compressed beamforming frames based on the NDPA frame transmitted from the beamformer to the multiple beamformees. For example, the multiple beamformees may simultaneously transmit the multiple HE compressed beamforming frames based on information (e.g., one or more of the Feedback Type, Nc Index, Nr Index, Grouping, and Codebook Information subfields of the STA Info field) included in the NDPA frame transmitted from the beamformer to the multiple beamformees.

To simultaneously transmit the multiple HE compressed beamforming frames by the multiple beamformees, the sizes of the HE compressed beamforming frames transmitted by the multiple beamformees may be identically set. The sizes of the HE compressed beamforming frames may be determined based on the information included in the NDPA frame (e.g., one or more of the Feedback Type, Nc Index, Nr Index, Grouping, and Codebook Information subfields of the STA Info field). Specifically, each piece of information included in the NDPA frame provided to the multiple beamformees by the beamformer (e.g., one or more of the Feedback Type, Nc Index, Nr Index, Grouping, and Codebook Information subfields of the STA Info field) may be set to the same value with respect to the multiple beamformees that simultaneously transmit the multiple compressed beamforming frames. Referring back to FIG. 18, the sizes of the HE compressed beamforming frames of STA1 and STA2 may be equally set and the sizes of the HE compressed beamforming frames of STA3 and STA4 may be equally set.

Figure 20:
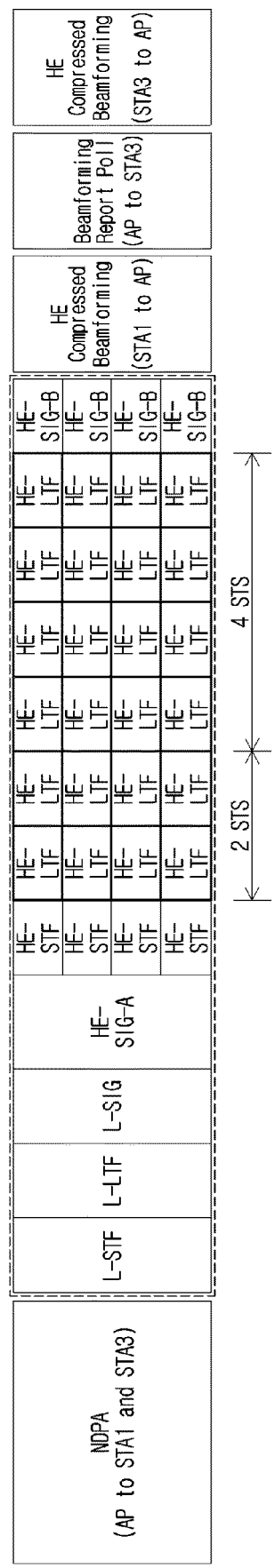
FIGS. 20 to 22 depict additional exemplary sounding protocols according to the present disclosure.

FIG. 20 depicts another exemplary sounding protocol according to the present disclosure.

FIG. 20 illustrates an additional example for simultaneously performing NDP sounding with respect to STAs having different beamformee STS capabilities. To this end, a plurality of durations corresponding to different beamformee STS capabilities may be consecutively transmitted in a transmission duration of a HE-LTE field used for channel estimation for an STS in an NDP frame format.

In the example of FIG. 20, it may be assumed that beamformee STS capabilities of STA1 and STA2 are two STSs and beamformee STS capabilities of STA3 and STA4 are four STSs. In this case, the number of HE-LTFs out of a HE preamble transmitted after a legacy preamble (an L-STF, an L-LTF, and an L-SIG field) in an NDP frame may be a total of 6. That is, the HE-LTFs of the NDP frame may include HE-LTFs adding two HE-LTFs for channel estimation of two STSs for STA1 and STA2 and four HE-LTFs for channel estimation of four STSs for STA3 and STA4.

In this case, information indicating which HE-LTF is used for channel estimation of a certain STA (or an STS of which STA) may be included in the NDPA frame.

As such, STA1 or STA2 may transmit a HE compressed beamforming frame including a channel estimation value (e.g., CSI) calculated based on the first two HE-LTFs in a HE preamble of the NDP frame to the AP as an immediate response to the NDP frame or an immediate response to a Beamforming Report Poll frame. STA3 or STA4 may transmit a HE compressed beamforming frame including a channel estimation value (e.g., CSI) calculated based on the next four HE-LTFs of the first two HE-LTFs in the HE preamble of the NDP frame to the AP as an immediate response to the NDP frame or as an immediate response to the Beamforming Report Poll frame.

Figure 21:
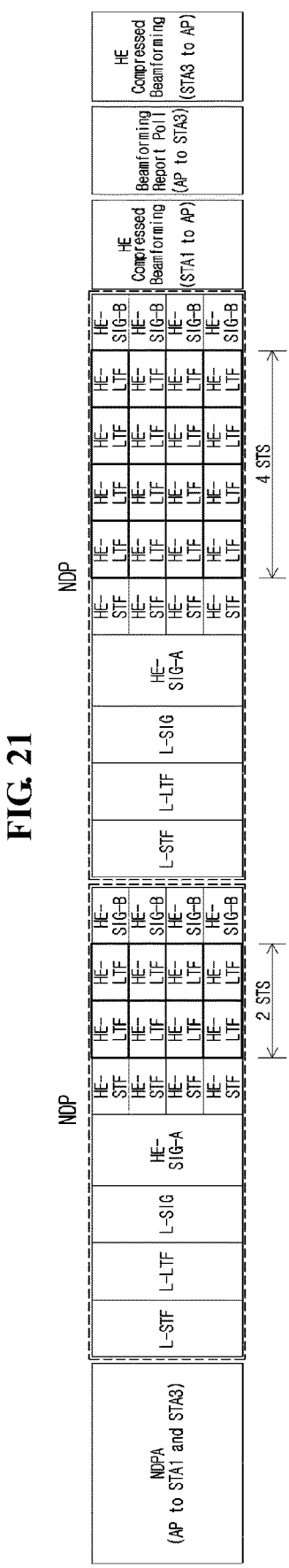

FIG. 21 depicts another exemplary sounding protocol according to the present disclosure.

FIG. 21 illustrates an additional example for simultaneously performing NDP sounding with respect to STAs having different beamformee STS capabilities. To this end, two different NDP frames may be transmitted at an interval of an SIFS after NDPA frame transmission.

In the example of FIG. 21, it may be assumed that beamformee STS capabilities of STA1 and STA2 are two STSs and beamformee STS capabilities of STA3 and STA4 are four STSs. In this case, two HE-LTFs for channel estimation of two STSs for STA1 and STA2 may be included in the first transmitted NDP frame and four HE-LTFs for channel estimation of four STSs for STA3 and STA4 may be included in the second transmitted NDP frame.

In this case, information indicating which NDP frame is used for channel estimation of a certain STA (or an STS of which STA) may be included in the NDPA frame.

As such, STA1 or STA2 may transmit a HE compressed beamforming including a channel estimation value (e.g., CSI) calculated based on two HE-LTFs of the first NDP frame to the AP as an immediate response to the last NDP frame or an immediate response to the Beamforming Report Poll frame. STA3 or STA4 may transmit a HE compressed beamforming frame including a channel estimation value (e.g., CSI) calculated based on four HE-LTFs of the second NDP frame to the AP as an immediate response to the NDP frame or as an immediate response to the Beamforming Report Poll frame.

Although the NDPA frame is transmitted to STA1 and STA3, and STA1 and STA3 transmit the HE compressed beamforming frames in the illustrated examples of FIGS. 20 and 21, the present disclosure is not limited thereto. That is, the NDPA frame for designating one or more of STA1, STA2, STA3, and STA4 as NDP sounding target STAs may be transmitted from the AP, one NDP frame (i.e. the example of FIG. 20) or multiple NDP frames (i.e. the example of FIG. 21) for channel estimation for the designated NDP sounding target STAs may be transmitted from the AP, and the HE compressed beamforming frame from each of the designated target STAs may be transmitted to the AP as an immediate response to the NDP frame or as an immediate response to the Beamforming Report Poll frame.

Figure 22:
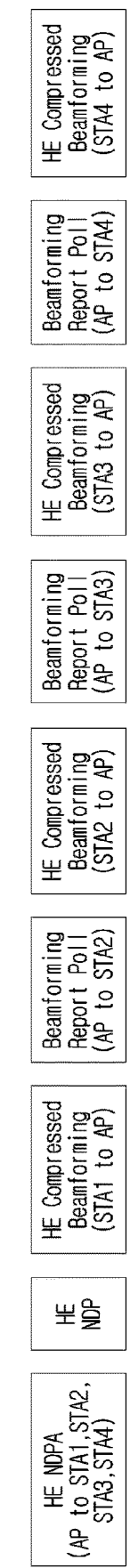

The above-described examples of the present disclosure represent that HE compressed beamforming frames are sequentially transmitted from multiple STAs over one channel (e.g., a 20 MHz channel). That is, as illustrated in FIG. 22, a HE compressed beamforming frame from one STA may be transmitted as a response to the NDPA frame (or NDPA and NDP frames) or as a response to the Beamforming Report Poll frame over one channel and a HE compressed beamforming frame from another STA may be transmitted as a response to an additional Beamforming Report Poll frame.

Figure 23:
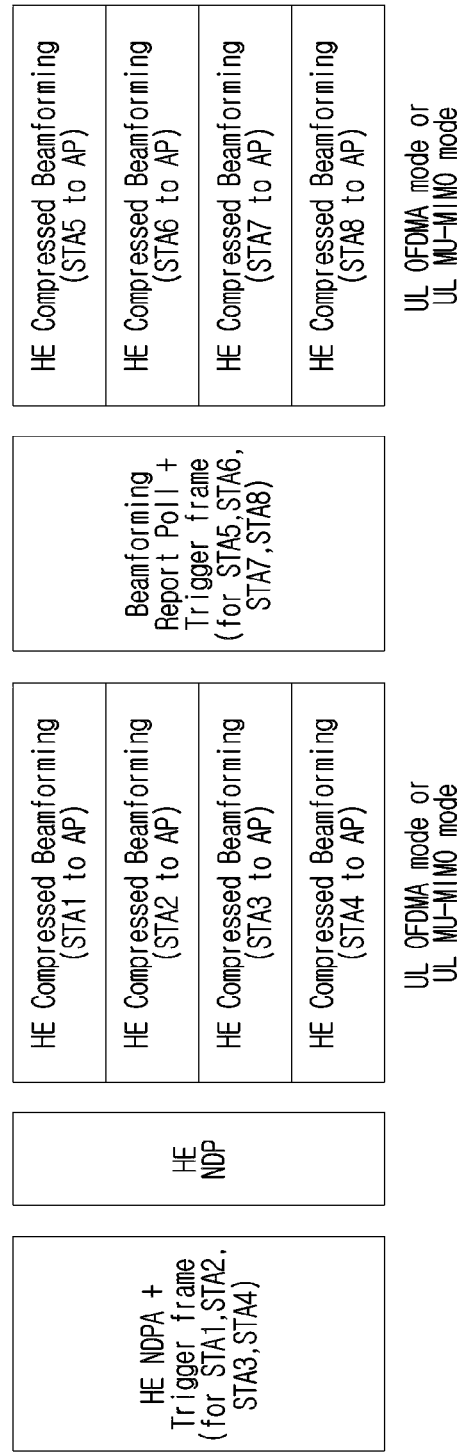
FIG. 23 depicts another exemplary sounding protocol according to the present disclosure.

FIG. 23 depicts another exemplary sounding protocol according to the present disclosure.

In the illustrated example of FIG. 23, multiple STAs simultaneously report HE compressed beamforming feedback over one channel in a WLAN system supporting UL MU transmission (e.g., UL MU-MIMO transmission or UL OFDMA transmission). That is, a HE PPDU including HE compressed beamforming feedback from multiple STAs over one channel may be transmitted by a UL MU transmission mode.

In this way, simultaneous transmission of the HE compressed beamforming frames (i.e., by the UL MU transmission mode) by multiple STAs may be set or indicated through an NDPA frame or a Beamforming Report Poll frame of a sounding protocol having the multiple STAs as target STAs.

As illustrated in FIG. 23, the HE NDPA frame or the Beamforming Report Poll frame may further include information initiating or eliciting UL MU transmission (e.g., UL MU transmission trigger information or UL MU transmission scheduling information). Alternatively, the HE NDPA frame or the Beamforming Report Poll frame may include a trigger frame initiating or eliciting UL MU transmission. For example, the HE NDPA frame and the trigger frame eliciting UL MU transmission may be integrated and the Beamforming Report Poll frame and the trigger frame eliciting UL MU transmission may be integrated.

HE beamformees (e.g., STA1, STA2, STA3, and STA4) may receive the HE NDPA frame including UL MU transmission trigger information from a HE beamformer (e.g., AP) with which the HE beamformees are associated and receive a HE NDP frame after an SIFS from reception of the HE NDPA frame. In this case, the HE beamformees may simultaneously transmit HE PPDUs including HE compressed beamforming feedback thereof by a UL OFDMA mode or a UL MU-MIMO mode after an SIFS from reception of the HE NDP frame.

In addition, upon receiving a Beamforming Report Poll frame including the UL MU transmission trigger information from the HE beamformer (e.g., AP) with which the HE beamformees (e.g., STA1, STA2, STA3, and STA4) are associated, the HE beamformees may simultaneously transmit the HE PPDUs including the HE compressed beamforming feedback thereof by the UL OFDM mode or the UL MU-MIMO mode after an SIFS from reception of the Beamforming Report Poll frame.

Even when the sounding protocol is performed over each of a plurality of channels (e.g., similarly to the example of FIG. 18, a low 20 MHz channel and a high 20 MHz channel), the trigger information for UL MU transmission may be included in the NDPA frame and a plurality of STAs that received the NDP frame after the NDPA frame may simultaneously transmit the HE compressed beamforming frames using the UL MU transmission mode. Further, the trigger information for UL MU transmission may be included in the Beamforming Report Poll frame transmitted from the AP over each channel and a plurality of STAs that have received the Beamforming Report Poll frame may simultaneously transmit the HE compressed beamforming frames by the UL MU transmission mode. For example, STA1 and STA2 that have received the NDPA frame (or NDPA frame and NDP frame) or the Beamforming Report Poll frame over a low 20 MHz channel may simultaneously transmit the HE compressed beamforming frames by the UL MU transmission mode and STA3 and STA4 that have received the NDPA frame (or NDPA frame and NDP frame) or the Beamforming Report Poll frame over a high 20 MHz channel may simultaneously transmit the HE compressed beamforming frames using the UL MU transmission mode.

Herein, to identically set transmission times of the HE compressed beamforming feedback transmitted from the multiple beamformees, grouping levels of the HE compressed beamforming feedback, i.e., Ng, may be equally set with respect to the multiple beamformees. The grouping levels set with respect to the multiple beamformees may be provided to the multiple beamformees through the NDPA frame.

In this way, the multiple beamformees may simultaneously transmit the HE compressed beamforming frames by the UL MU transmission mode by setting or indication through the NDPA frame or the Beamforming Report Poll frame in the sounding protocol for the multiple beamformees.

The beamformer may determine whether to apply beamforming to each of the multiple beamformees in consideration of the HE compressed beamforming feedback (e.g., CSI) reported from the multiple beamformees and transmit the HE PPDU to which beamforming is applied according to the determined result.

Figure 24:
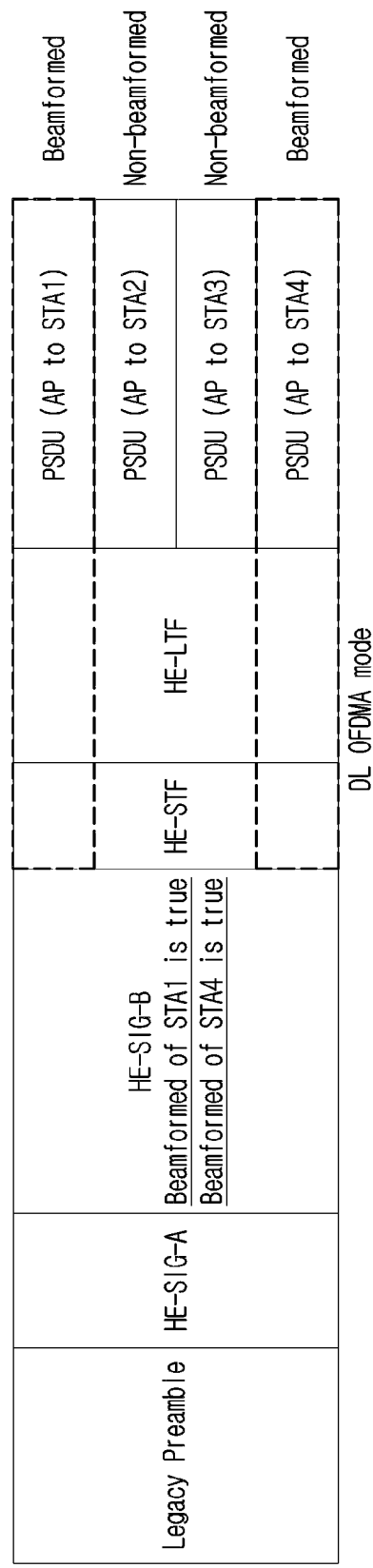

FIGS. 24 and 25 depict exemplary DL HE PPDU frame formats supporting DL beamforming transmission according to the present disclosure.

If an AP transmits a beamformed DL HE PPDU to a plurality of STAs, a parameter indicating whether beamforming is applied to each of the multiple STA (or each of multiple subchannels) (e.g., a "Beamformed" parameter) may be encoded and then included in a HE-SIG field (e.g., HE-SIG-A field or HE-SIG-B field) of the DL HE PPDU.

If the Beamformed parameter for any STA is set to True (i.e., if the parameter indicates that beamforming is applied to a corresponding STA or a subchannel allocated to a corresponding STA), smoothing may not be applied.

In the example of FIG. 24, the AP may transmit a DL OFDMA HE PPDU including the Beamformed parameter for each of STA1, STA2, STA3, and STA4 to STA1, STA2, STA3, and STA4. Herein, it is assumed that the Beamformed parameter for each of STA1 and STA4 is set to True. Therefore, a beamforming steering matrix may be applied to a HE-STF, a HE-LTF, and a PSDU having STA1 as a target STA and the beamforming steering matrix may be applied to the HE-STF, the HE-LTF, and the PSDU having STA4 as the target STA. In this case, smoothing may not be applied to STA1 and STA4 receiving a beamformed DL HE PPDU. Meanwhile, the beamforming steering matrix may not be applied to the HE-STF, the HE-LTF, and the PSDU having STA2 and STA3 as target STAs.

Thus, the Beamformed parameter included in the HE-SIG field of the HE PPDU may be user-specifically (or STA-specifically or beamformee-specifically) set.

As an additional example of the present disclosure, the Beamformed parameter included in the HE-SIG field of the HE PPDU may also be subchannel-specifically set.

In FIG. 25, an AP may transmit a DL OFDMA HE PPDU including a Beamformed parameter for each of subchannel1 (CH1), subchannel2 (CH2), subchannel3 (CH3), and subchannel4 (CH4) to STA1, STA2, STA3, STA4, STA5, STA6, STA7, and STA8. Herein, it is assumed that the Beamformed parameter for each of CH1 and CH4 is set to True. Then, a beamforming steering matrix may be applied to a HE-STF, a HE-LTF, and a PSDU (i.e., having STA1 and STA5 as target STAs) transmitted over CH1 and the beamforming steering matrix may be applied to the HE-STF, the HE-LTF, and the PSDU (i.e., having STA4 and STA8 as target STAs) transmitted over CH4. In this case, smoothing may not be applied to STA1, STA4, STA5, and STA8 receiving a beamformed-applied DL HE PPDU over CH1 and CH4. On the other hand, the beamforming steering matrix may not be applied to the HE-STF, the HE-LTF, and the PSDU (having STA2 and STA3 as target STAs and having STA6 and STA7 as target STAs) transmitted over each of CH2 and CH3.

Meanwhile, since the beamforming steering matrix may always be applied to a transmission signal waveform with respect to the DL HE PPDU transmitted by a DL MU-MIMO mode, the Beamformed parameter may not be included in the HE PPDU.

FIGS. 26 to 30 depict exemplary trigger frame formats and UL HE PPDU frame formats supporting UL beamforming according to the present disclosure.

If an AP transmits a trigger frame initiating or eliciting transmission of a beamformed UL HE PPDU to a plurality of STAs, the STAs may transmit a UL HE PPDU frame to the AP as an immediate response to the trigger frame (e.g., after an SIFS from reception of the trigger frame).

When the beamformed UL HE PPDU is transmitted from the multiple STAs, a parameter indicating whether beamforming is applied to each of the multiple STA (or each of multiple subchannels) (e.g., the "Beamformed" parameter) may be encoded and then included in a HE-SIG field (e.g., HE-SIG-A field or HE-SIG-B field) of the UL HE PPDU.

Figure 26:
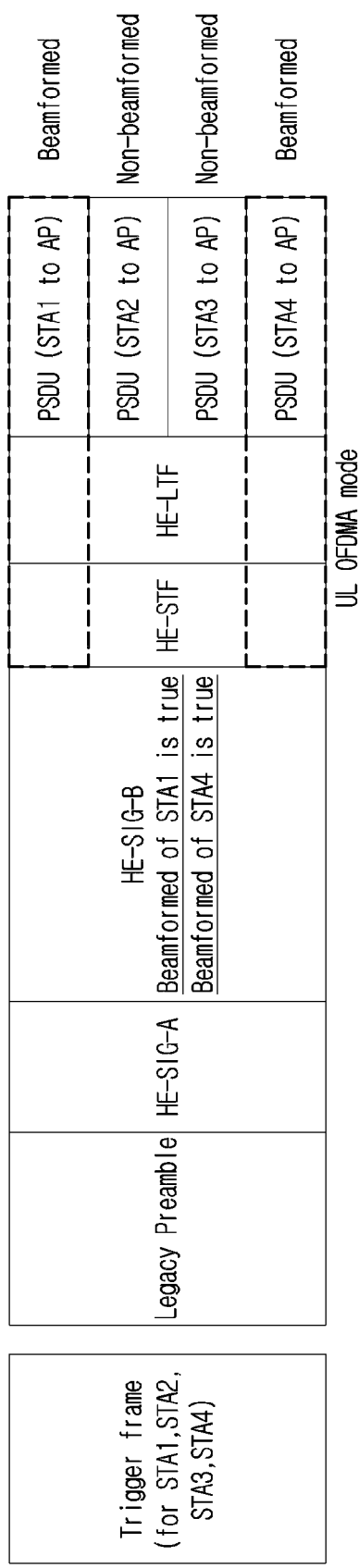
FIGS. 26 to 30 depict exemplary trigger frame formats and UL HE PPDU frame formats supporting UL beamforming according to the present disclosure.

As in the example of FIG. 26, when STA1, STA2, STA3, and STA4 transmit a beamformed or non-beamformed UL HE PPDU, the UL HE PPDU may include the Beamformed parameter for each of STA1, STA2, STA3, and STA4 in the HE-SIG field (e.g., HE-SIG-A field or HE-SIG-B field). In the example of FIG. 26, it is assumed that the Beamformed parameter for each of STA1 and STA4 is set to True.

If the HE-SIG field (e.g., HE-SIG-B field) of the UL HE PPDU includes control information commonly applied to the multiple STAs (or multiple subchannels), the Beamformed parameter may not be included in the UL HE PPDU. Since the AP determines the Beamformed parameter of the UL HE PPDU and informs all STAs, that are to transmit the UL HE PPDU, of the Beamformed parameter, it is not necessary for the STAs to inform the AP of the Beamformed parameter in transmission of the UL HE PPDU. Therefore, the Beamformed parameter may be included in the UL HE PPDU only when the control information of the HE-SIG field of the UL HE PPDU is not commonly applied to the multiple STAs (or multiple subchannels).

As an additional example of the present disclosure, the Beamformed parameter for each STA (or each subchannel) may not be included in the HE-SIG field (e.g., the HE-SIG-A or HE-SIG-B field) of the UL HE PPDU. Further, the UL HE PPDU frame may not include the HE-SIG-B field. In this case, the trigger frame eliciting UL MU transmission may include a smoothing parameter indicating whether to apply smoothing to each of the multiple STAs (or each of the multiple subchannels) with respect to the UL HE PPDU received by the AP.

When the smoothing parameter included in the trigger frame is set to True for any STA (or any subchannel), beamforming may not be applied to transmission from a corresponding STA (or a corresponding subchannel) in the UL HE PPDU. That is, since it is desirable that smoothing not be applied to an AP receiving beamformed UL transmission, an STA may not apply beamforming to UL transmission to which the AP has indicated that smoothing will be applied. This may be understood as meaning that the AP indirectly or implicitly indicates that beamforming is not user-specifically or subchannel-specifically applied to UL transmission.

If the smoothing parameter included in the trigger frame is set to False with respect to any STA (or any subchannel), beamforming may or may not be applied to transmission from the corresponding STA (or over the corresponding subchannel) in the UL HE PPDU. That is, since the AP receiving beamformed UL transmission does not desirably apply smoothing to the beamformed UL transmission and may apply or may not apply smoothing receiving non-beamformed UL transmission, the STA may apply or may not apply beamforming to UL transmission. Therefore, the STA may apply or may not apply beamforming to UL transmission to which the AP indicates that smoothing will not be applied. This may be understood as meaning that whether beamforming is applied to UL transmission to which the AP indicates that smoothing will not be applied is determined by the STA.

Figure 27:
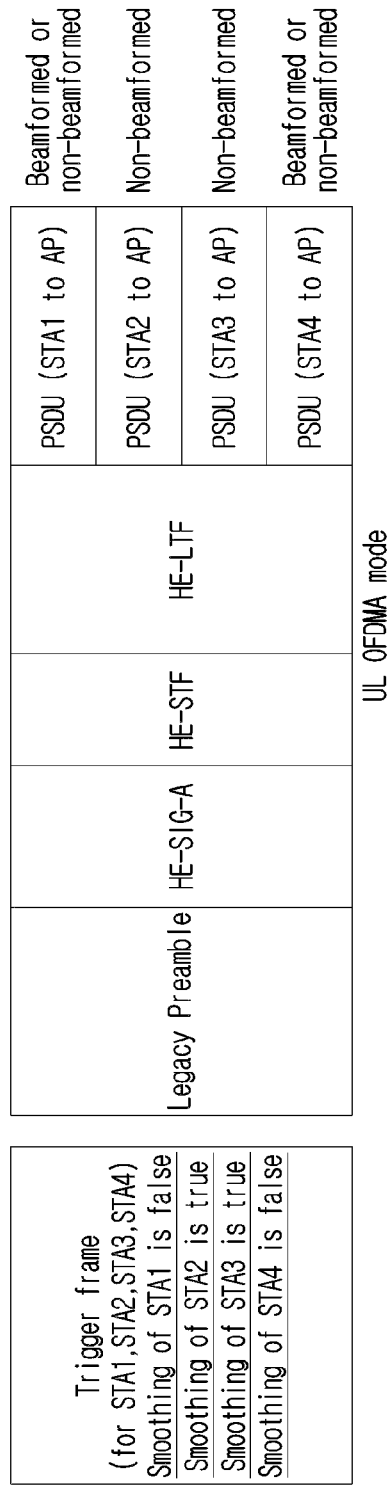

In the example of FIG. 27, the HE-SIG-B field may not be included (or may be omitted) in the UL HE PPDU and whether beamforming is applied to each STA (or each subchannel) may be determined based on a smoothing operation of a beamformer (i.e. AP) indicated by the trigger frame. If the smoothing parameter included in the trigger frame is set to True with respect to each of STA2 and STA3, a beamforming steering matrix is not applied to a PSDU (or a HE-STF, a HE-LTF, and a PSDU or a legacy preamble, a HE-SIG-A, a HE-STF, a HE-LTF, and a PSDU) transmitted by each of STA2 and STA3. Meanwhile, if the smoothing parameter included in the trigger frame is set to False with respect to each of STA1 and STA4, the beamforming steering matrix may or may not be applied to a PSDU (or a HE-STF, a HE-LTF, and a PSDU or a legacy preamble, a HE-SIG-A, a HE-STF, a HE-LTF, and a PSDU) transmitted by each of STA1 and STA4 and this may be determined by each of STA1 and STA4.

As an additional example of the present disclosure, the Beamformed parameter may be included in the trigger frame instead of the smoothing parameter. That is, if the Beamformed parameter for each STA (or each subchannel) is not included in the HE-SIG field (e.g., the HE-SIG-A or HE-SIG-B field) of the UL HE PPDU, the Beamformed parameter indicating whether beamforming is applied to each of multiple STAs (or each of multiple subchannels) with respect to the UL HE PPDU received by the AP may be included in the trigger frame eliciting UL MU transmission. Unlike the smoothing parameter indirectly or implicitly indicating whether beamforming is applied in the UL HE PPDU, the Beamformed parameter may directly or explicitly indicate whether beamforming is applied in the UL HE PPDU.

If the Beamformed parameter included in the trigger frame is set to True with respect to any STA (or any subchannel), beamforming may be applied to transmission from the corresponding STA (or over the corresponding subchannel) in the UL HE PPDU.

If the Beamformed parameter included in the trigger frame is set to False with respect to any STA (or any subchannel), beamforming may not be applied to transmission to the corresponding STA (over the corresponding subchannel) in the UL HE PPDU.

Figure 28:
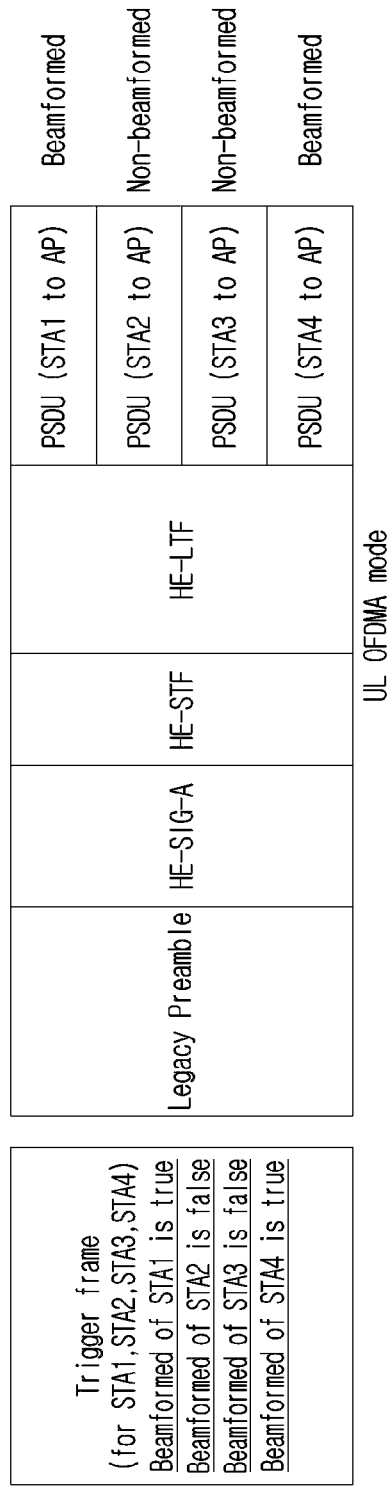

In the example of FIG. 28, the HE-SIG-B field may not be included (or may be omitted) in the UL HE PPDU and whether beamforming is applied to each STA (or each subchannel) may be determined based on the Beamformed parameter indicated by the trigger frame. If the Beamformed parameter included in the trigger frame is set to False with respect to each of STA2 and STA3, the beamforming steering matrix is not applied to a PSDU (or a HE-STF, a HE-LTF, and a PSDU or a legacy preamble, a HE-SIG-A, a HE-STF, a HE-LTF, and a PSDU) transmitted by each of STA2 and STA3. Meanwhile, if the Beamformed parameter included in the trigger frame is set to True with respect to each of STA1 and STA4, the beamforming steering matrix is applied to a PSDU (or a HE-STF, a HE-LTF, and a PSDU or a legacy preamble, a HE-SIG-A, a HE-STF, a HE-LTF, and a PSDU) transmitted by each of STA1 and STA4.

Figure 29:
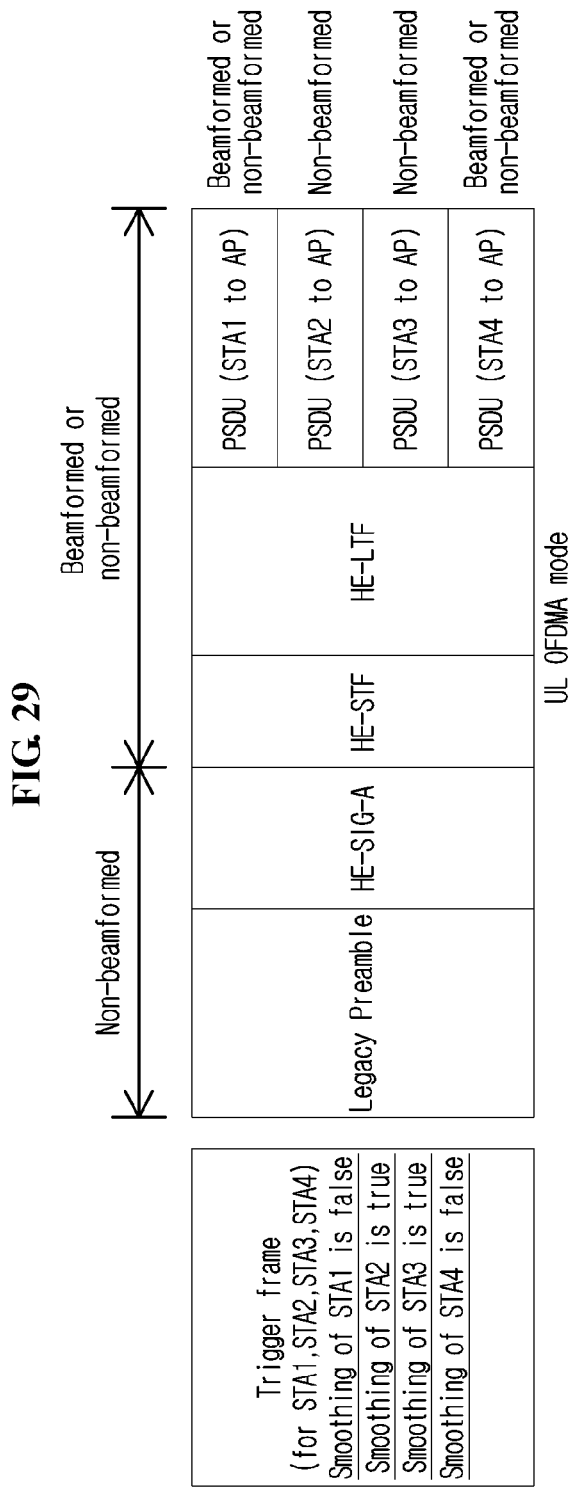
Figure 30:
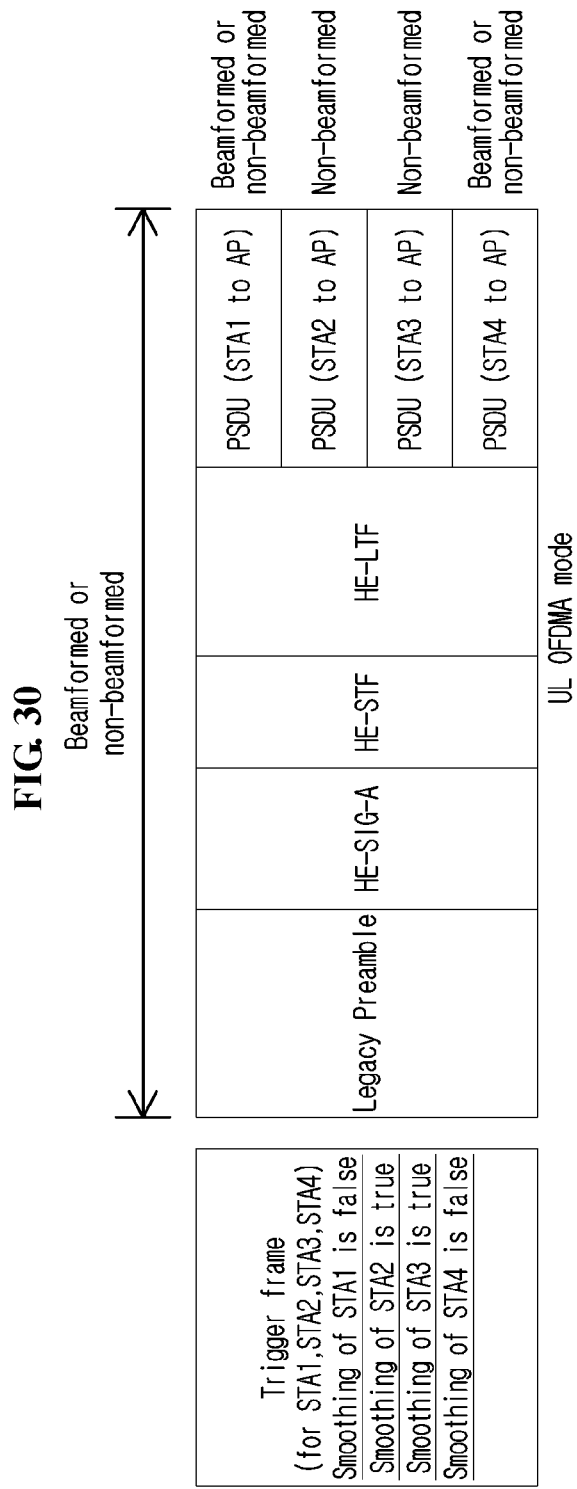

FIGS. 29 and 30 depict exemplary parts to which beamforming is applied in a UL HE PPDU according to the present disclosure.

The example of FIG. 29 indicates the case in which durations during which applying beamforming is permitted in a UL HE PPDU are a HE-STF, a HE-LTF, and a PSDU and the example of FIG. 30 indicates the case in which durations during which applying beamforming is permitted are all durations of the UL HE PPDU (i.e., a legacy preamble, a HE-SIG-A, a HE-STF, a HE-LTF, and a PSDU).

Specifically, in the example of FIG. 29, a beamforming steering matrix may not be applied to a legacy preamble (an L-STF, an L-LTF, and an L-SIG field) and a HE-SIG-A field in the UL HE PPDU and the beamforming steering matrix may or may not be applied to a HE-STF, a HE-LTF, and a PSDU according to indication of an AP or according to determination by an STA. In this case, even a legacy STA that does not recognize a HE PPDU frame format may decode LENGTH information of a legacy preamble (e.g., L-SIG) of a HE PPDU and determine that a channel is occupied for a corresponding time, thereby protecting transmission of the HE PPDU. Meanwhile, the legacy preamble and the HE-SIG-A field have low beamforming gain because beamforming is not applied thereto.

In the example of FIG. 30, a beamforming steering matrix may or may not be applied to the legacy preamble (an L-STF, an L-LTF, and an L-SIG field), a HE-SIG-A field, a HE-STF, a HE-LTF, and a PSDU according to indication of an AP or according to determination by an STA. In this case, although beamforming gain for the legacy preamble and the HE-SIG-A field may be obtained, a legacy STA cannot decode the legacy preamble of the HE PPDU.

Meanwhile, as illustrated in FIGS. 24 to 26, the beamforming steering matrix may not be applied to a part (e.g., the legacy preamble, the HE-SIG-A field, and the HE-SIG-B field) in the DL HE PPDU and the beamforming steering matrix may or may not be applied to the other parts (e.g., the HE-STF, the HE-LTF, and the PSDU) in the DL HE PPDU. Alternatively, the beamforming steering matrix may or may not be applied to all durations (e.g., the legacy preamble, the HE-SIG-A field, the HE-SIG-B field, the HE-STF, the HE-LTF, and the PSDU) in the DL HE PPDU.

Figure 31:
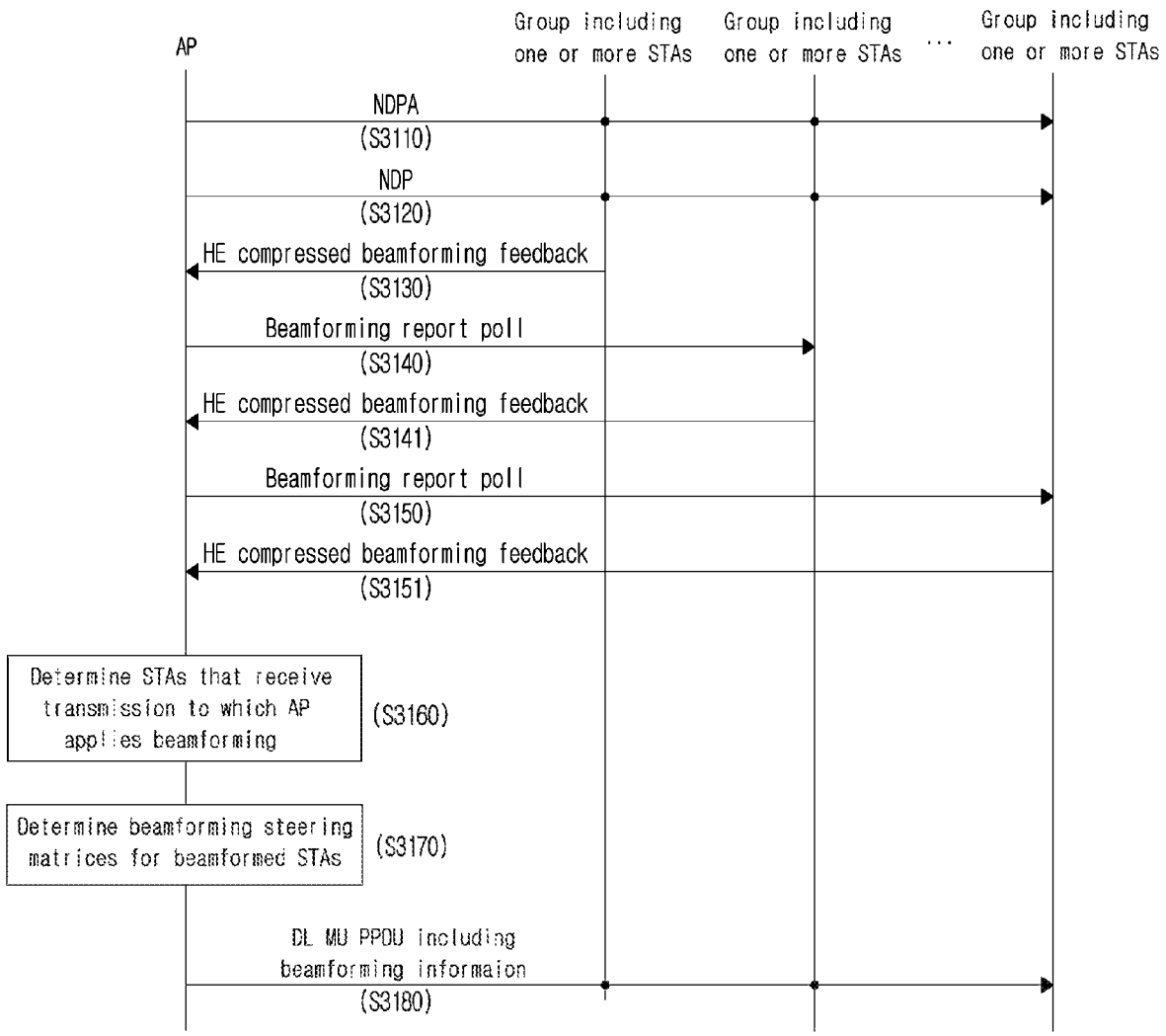
FIG. 31 is a flowchart depicting an exemplary method according to the present disclosure.

FIG. 31 is a flowchart depicting an exemplary method according to the present disclosure.

In step S3110, an AP may transmit an NDPA frame to a plurality STAs to inform the STAs that the AP will transmit an NDP frame after the NDPA frame. The NDPA frame may include a list indicating the plurality of STAs. The NDPA frame may further include trigger information for UL MU transmission from N (N≥2) STAs among the plurality of STAs.

In step S3120, the AP may transmit the NDP frame following the NDPA frame to the STAs.

If the trigger information for UL MU transmission is not included in the NDPA frame transmitted in step S3110, the first STA of the STA list included in the NDPA frame may receive the NDP frame even without receiving an additional polling frame (e.g., a Beamforming Report Poll frame) from the AP and transmit a beamforming feedback report to the AP in step 3130 immediately after receiving the NDP frame (e.g., after an SIFS from an NDP frame end time).

If the trigger information for UL MU transmission from N (N≥2) STAs is included in the NDPA frame transmitted in step S3110, the AP may simultaneously receive beamforming feedback reports (e.g., HE compressed beamforming feedback frames) from the N STAs in step S3130. The feedback reports from the N STAs may include beamforming associated information (refer to the example of FIG. 19) included in the NDPA frame and a channel estimation result (e.g., CSI) based on a HE-LTF, etc. of the NDP frame. In addition, simultaneous transmission of the beamforming feedback reports from the N STAs (e.g., HE compressed beamforming frames of a UL MU transmission mode) may be performed according to the trigger information for UL MU transmission included in the NDPA frame.

If there are STAs that have not transmitted the beamforming feedback reports in step S3130 among the STAs of the STA list of the NDPA frame, steps S3140 and S3141, which will be described below, may be performed with respect to some or all of the STAs that have not transmitted the beamforming feedback reports.

In step S3140, the AP may transmit the Beamforming Report Poll frame to a group including one or more additional STAs and the one or more STAs may transmit the beamforming feedback reports (e.g., HE compressed beamforming feedback frames) to the AP in response to the Beamforming Report Poll frame. The Beamforming Report Poll frame may further include the trigger information for UL MU transmission.

If the Beamforming Report Poll frame is transmitted to one STA and the trigger information for UL MU transmission is not included in the Beamforming Report Poll frame in step S3140, the one STA receiving the Beamforming Report Poll frame may transmit the beamforming feedback report to the AP in step S3141.

If the Beamforming Report Poll frame is transmitted to two or more STAs (i.e., M≥2) in step S3140 and the Beamforming Report Poll frame includes the trigger information for UL MU transmission from the two or more STAs, the two or more STAs receiving the Beamforming Report Poll frame may simultaneously transmit the beamforming feedback reports (e.g., HE compressed beamforming feedback frames) to the AP in step S3141.

If there are STAs that have not transmitted the beamforming feedback reports in steps S3130 and S3141 among the STAs of the STA list of the NDPA frame, steps S3150 and S3151 may be performed with respect to the STAs that have not transmitted the beamforming feedback reports. Steps S3150 and S3151 correspond to steps S3140 and S3141 and represent transmission of the Beamforming Report Poll frame for a group including one or more additional STAs and transmission of the beamforming feedback reports in response to the Beamforming Report Poll frame.

In this way, the beamforming feedback reports may be transmitted to the AP from all of the STAs of the STA list included in the NDPA frame through step S3130 (or steps S3130 to S3151).

In step S3160, the AP may determine whether to apply beamforming to a plurality of data units (e.g., PSDUs) transmitted to the STAs based on the beamforming feedback reports from the STAs.

In step S3170, the AP determines beamforming steering matrices to be applied to transmission to corresponding STAs based on the beamforming feedback report from the corresponding STAs with respect to one or more STAs (i.e., beamformee STAs) to which beamforming is determined to be applied.

In step S3180, the AP may transmit a DL HE PPDU to the multiple STAs. The DL HE PPDU may include beamforming information indicating whether beamforming is individually applied to each of the multiple data units (or multiple subchannels or multiple STAs) in a HE-SIG field (e.g., a HE-SIG-B field). In addition, the AP may transmit the DL HE PPDU by individually applying beamforming (i.e., by applying the beamforming steering matrix determined for a corresponding STA) or by not applying beamforming to each of the data units (or subchannels or STAs) according to the beamforming information.

Figure 32:
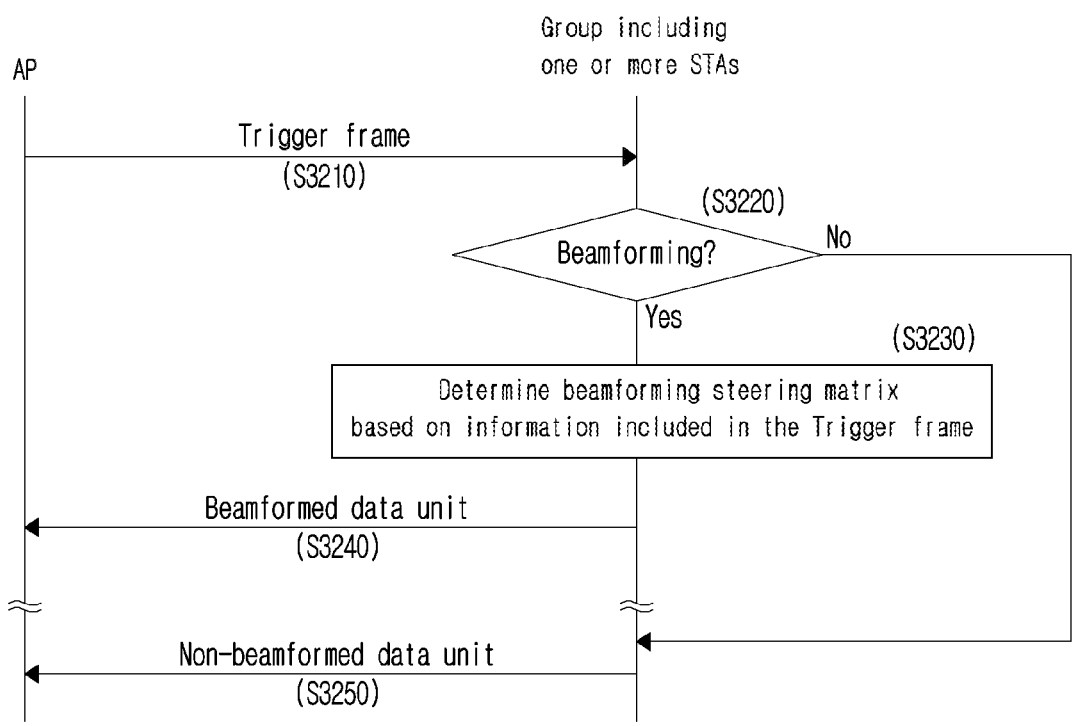
FIG. 32 is a flowchart depicting another exemplary method according to the present disclosure.

FIG. 32 is a flowchart depicting another exemplary method according to the present disclosure.

An AP may transmit a trigger frame to an STA group (i.e., a group including one or more STAs) in step S3210. An STA receiving the trigger frame may simultaneously generate a UL HE PPDU together with one or more other STAs (i.e. using a UL MU transmission mode). The trigger frame may include scheduling information for UL MU transmission and may include beamforming information indicating whether to individually apply beamforming to each of a plurality of data units (or a plurality of subchannels or STAs) of the UL HE PPDU.

In step S3220, each of the STAs belonging to the STA group may determine whether to apply beamforming to a data unit (or a subchannel over which the data unit is transmitted) that each STA is to transmit based on the beamforming information included in the trigger frame.

The STA that has determined that beamforming is applied for transmission of the UL data unit in step S3220 may determine a beamforming steering matrix to be applied to the data unit that the STA transmits in step S3230. The STA may determine the beamforming steering matrix based on information included in the trigger frame. In step S3240, the STA may simultaneously transmit a beamformed data unit (i.e., a data unit to which the beamforming steering matrix is applied) to the AP together with one or more other STAs (i.e., using the UL MU transmission mode).

The STA that has determined that beamforming is not applied for transmission of the UL data unit in step S3220 may simultaneously transmit a non-beamformed data unit to the AP together with one or more other STAs (i.e., using the UL MU transmission mode) in step S3250.

That is, any STA belonging to the STA group may transmit the UL HE PPDU including a beamformed or non-beamformed data unit according to the beamforming information included in the trigger frame. In transmission of the UL HE PPDU, one or more other beamformed or non-beamformed data units (or one or more other STAs or one or more other subchannels) may be simultaneously transmitted to the AP together with the data unit of the STA.

While the exemplary method has been described with reference to FIGS. 31 and 32 as a series of operations for simplicity of description, this does not limit the sequence of steps. When needed, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the method of FIGS. 31 and 32.

The present disclosure includes an apparatus for processing or performing the method of the present disclosure (e.g., the wireless device and its components described with reference to FIGS. 1, 2, and 3).

The present disclosure includes software (an operating system (OS), an application, firmware, a program, etc.) for executing the method of the present disclosure in a device or a computer, and a medium storing the software that can be executed in a device or a computer.

While various embodiments of the present disclosure have been described in the context of an IEEE 802.11 system, they are applicable to various mobile communication systems.

What is claimed is:

1. A method of facilitating beamformed transmissions in a wireless local area network, the method comprising:
transmitting signaling information indicating whether beamforming is applied to data units of a downlink frame over one or more subcarriers, wherein the signaling information is transmitted over each of a plurality of subchannels;
transmitting the data units of the downlink frame over the one or more subcarriers allocated respectively to a set of stations, wherein the data units are beamformed or not on the one or more subcarriers according to the signaling information, and
applying the beamforming identically to all of the one or more subcarriers, wherein the signaling information in each of the plurality of subchannels commonly indicates whether the beamforming is applied to the one or more subcarriers.

2. The method of claim 1, wherein the downlink frame is a high-efficiency (HE) Physical layer Protocol Data Unit (PPDU).

3. The method of claim 2, wherein the signaling information is included in a HE-SIG-A field of the HE PPDU.

4. The method of claim 2, wherein the signaling information is included in a HE-SIG-B field of the HE PPDU.

5. The method of claim 1, wherein the signaling information includes a single bit to indicate whether the beamforming is applied to the data units of the downlink frame over the one or more subcarriers, and
wherein when the single bit has a first value, the beamforming is applied to the data units of the downlink frame over the one or more subcarriers, and when the single bit has a second value, the beamforming is not applied to the data units of the downlink frame over the one or more subcarriers.

6. The method of claim 1, wherein the signaling information is transmitted in a signal field of the downlink frame that is transmitted after a high-efficiency (HE) SIG-A field of the downlink frame.

7. The method of claim 1, wherein the signaling information is transmitted in a signal field of the downlink frame that is transmitted prior to a long training field of the downlink frame.

8. The method of claim 1, wherein the signaling information is transmitted in a signal field of the downlink frame that is transmitted prior to a short training field of the downlink frame.

9. A method of facilitating beamformed transmissions in a wireless local area network, the method comprising:
receiving signaling information in a downlink frame that indicates whether beamforming is applied to one or more subcarriers allocated respectively to a set of stations, wherein the signaling information is received over each of a plurality of subchannels; and
transmitting an uplink frame to an access point in response to the downlink frame, wherein data units of the uplink frame are individually beamformed or not on the one or more subcarriers according to the signaling information,
wherein the beamforming is applied identically to all of the one or more subcarriers, wherein the signaling information in each of the plurality of subchannels commonly indicates whether the beamforming is applied to the one or more subcarriers.

10. The method of claim 9, further comprising:
transmitting a beamforming feedback report to the access point prior to receiving the downlink frame,
wherein whether the beamforming is applied to the one or more subcarriers is determined by the access point based on beamforming feedback reports simultaneously received from the set of stations.

11. The method of claim 10, wherein the beamforming feedback report is elicited by trigger information provided from the access point to the set of stations.

12. The method of claim 11, wherein the trigger information is included in a Non-Data Packet Announcement (NDPA) frame or a Beamforming Report Poll frame.

13. A station for facilitating multi-user communication in a wireless network, the station comprising:
one or more memories; and
one or more processors coupled to the one or more memories, the one or more processors configured to cause:
transmitting signaling information indicating whether beamforming is applied to data units of a downlink frame over one or more subcarriers, wherein the signaling information is transmitted over each of a plurality of subchannels;
transmitting the data units of the downlink frame over the one or more subcarriers allocated respectively to a set of stations, wherein the data units are beamformed or not on the one or more subcarriers according to the signaling information; and
applying the beamforming identically to all of the one or more subcarriers, wherein the signaling information in each of the plurality of subchannels commonly indicates whether the beamforming is applied to the one or more subcarriers.

14. The station of claim 13, wherein the signaling information includes a single bit to indicate whether the beamforming is applied to the data units of the downlink frame over the one or more subcarriers, and
wherein when the single bit has a first value, the beamforming is applied to the data units of the downlink frame over the one or more subcarriers, and when the single bit has a second value, the beamforming is not applied to the data units of the downlink frame over the one or more subcarriers.

15. The station of claim 13, wherein the one or more processors are configured to cause transmitting the signaling information in a signal field of the downlink frame that is transmitted after a high-efficiency (HE) SIG-A field of the downlink frame.

16. The station of claim 13, wherein the one or more processors are further configured to cause:
transmitting the signaling information in a signal field of the downlink frame that is transmitted prior to a long training field of the downlink frame or prior to a short training field of the downlink frame.

* * * * *